United States Patent
Hamaguchi et al.

(10) Patent No.: US 9,223,439 B2
(45) Date of Patent: Dec. 29, 2015

(54) SIGNAL PROCESSING SYSTEM, TOUCH PANEL CONTROLLER, TOUCH PANEL SYSTEM USING SAME, AND ELECTRONIC DEVICE

(71) Applicant: SHARP KABUSHIKI KAISHA, Osaka-shi, Osaka (JP)

(72) Inventors: Mutsumi Hamaguchi, Osaka (JP); Masayuki Miyamoto, Osaka (JP); Hiroshi Kuhara, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/425,293

(22) PCT Filed: Sep. 10, 2013

(86) PCT No.: PCT/JP2013/074391
§ 371 (c)(1),
(2) Date: Mar. 2, 2015

(87) PCT Pub. No.: WO2014/042153
PCT Pub. Date: Mar. 20, 2014

(65) Prior Publication Data
US 2015/0268792 A1    Sep. 24, 2015

(30) Foreign Application Priority Data
Sep. 11, 2012 (JP) ................. 2012-199993

(51) Int. Cl.
*G06F 3/045* (2006.01)
*G06F 3/041* (2006.01)
*G06F 3/044* (2006.01)

(52) U.S. Cl.
CPC .............. *G06F 3/0418* (2013.01); *G06F 3/044* (2013.01); *G06F 3/045* (2013.01); *G06F 3/0412* (2013.01); *G06F 2203/04101* (2013.01); *G06F 2203/04104* (2013.01); *G06F 2203/04111* (2013.01); *G06F 2203/04112* (2013.01)

(58) Field of Classification Search
CPC ....... G06F 3/0418; G06F 3/044; G06F 3/041; G06F 3/045; G06F 3/0412; G06F 2203/04101; G06F 2203/04112; G06F 2203/04104; G06F 2203/04111
USPC ..................... 345/173–174; 178/18.01–18.07
See application file for complete search history.

(56) References Cited

U.S. PATENT DOCUMENTS

| | | |
|---|---|---|
| 5,565,658 A | 10/1996 | Gerpheide et al. |
| 2008/0309625 A1 | 12/2008 | Krah et al. |
| 2009/0009483 A1 | 1/2009 | Hotelling et al. |
| 2010/0328239 A1 | 12/2010 | Harada et al. |

(Continued)

FOREIGN PATENT DOCUMENTS

| | | |
|---|---|---|
| JP | 11-505641 A | 5/1999 |
| JP | 2009-54141 A | 3/2009 |

(Continued)

*Primary Examiner* — Rodney Amadiz
(74) *Attorney, Agent, or Firm* — Birch, Stewart, Kolasch & Birch, LLP

(57) ABSTRACT

A signal processing system (10) includes a switching circuits (6) which switches between subsystems (5a, 5b), on a basis of a frequency of noise mixed in each of time-series signals, the amount of that noise, and input-output transfer characteristics, to reduce noise present in a result of estimation of the value of a linear element (CX), which estimation is performed by addition- and subtraction-based signal processing.

17 Claims, 27 Drawing Sheets

(56) References Cited

U.S. PATENT DOCUMENTS

| | | |
|---|---|---|
| 2012/0044180 A1 | 2/2012 | Matsui et al. |
| 2013/0286302 A1 | 10/2013 | Fujioka et al. |
| 2014/0104236 A1 | 4/2014 | Hamaguchi et al. |

FOREIGN PATENT DOCUMENTS

| | | |
|---|---|---|
| JP | 2011-8725 A | 1/2011 |
| JP | 2012-43394 A | 3/2012 |
| JP | 2013-3603 A | 1/2013 |
| WO | WO 96/18179 A1 | 6/1996 |
| WO | WO 2012/096259 A1 | 7/2012 |

F I G. 5

$$1^{st} \text{ vector} \quad \frac{-(C_{31})Vdrive}{C_{int}} \quad \cdots (\text{EXP.1})$$

$$2^{nd} \text{ vector} \quad \frac{-(C_{32})Vdrive}{C_{int}} \quad \cdots (\text{EXP.2})$$

$$\begin{bmatrix} 1 & 0 & 0 & 0 \\ 0 & 1 & 0 & 0 \\ 0 & 0 & 1 & 0 \\ 0 & 0 & 0 & 1 \end{bmatrix} \begin{bmatrix} C1 \\ C2 \\ C3 \\ C4 \end{bmatrix} = \begin{bmatrix} Y1 \\ Y2 \\ Y3 \\ Y4 \end{bmatrix} \quad \cdots (\text{EXP.3})$$

$$\begin{bmatrix} C1 \\ C2 \\ C3 \\ C4 \end{bmatrix} = \begin{bmatrix} Y1 \\ Y2 \\ Y3 \\ Y4 \end{bmatrix} \quad \cdots (\text{EXP.4})$$

F I G. 8

$$\begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} C1 \\ C2 \\ C3 \\ C4 \end{pmatrix} = \begin{pmatrix} Y1 \\ Y2 \\ Y3 \\ Y4 \end{pmatrix} \quad \cdots (\text{EXP.5})$$

$$\begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} C1 \\ C2 \\ C3 \\ C4 \end{pmatrix} = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} Y1 \\ Y2 \\ Y3 \\ Y4 \end{pmatrix} \quad \cdots (\text{EXP.6})$$

$$\begin{pmatrix} 4 & 0 & 0 & 0 \\ 0 & 4 & 0 & 0 \\ 0 & 0 & 4 & 0 \\ 0 & 0 & 0 & 4 \end{pmatrix} \begin{pmatrix} C1 \\ C2 \\ C3 \\ C4 \end{pmatrix} = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} Y1 \\ Y2 \\ Y3 \\ Y4 \end{pmatrix} \quad \cdots (\text{EXP.7})$$

FIG. 9

$$\begin{pmatrix} -1 & 1 & -1 & 1 & 1 & 1 & -1 \\ -1 & -1 & 1 & -1 & 1 & 1 & 1 \\ 1 & -1 & -1 & 1 & -1 & 1 & 1 \\ 1 & 1 & -1 & -1 & 1 & -1 & 1 \\ 1 & 1 & 1 & -1 & -1 & 1 & -1 \\ -1 & 1 & 1 & 1 & -1 & -1 & 1 \\ 1 & -1 & 1 & 1 & 1 & -1 & -1 \end{pmatrix} \begin{pmatrix} C1 \\ C2 \\ \cdot \\ \cdot \\ \cdot \\ \cdot \\ C7 \end{pmatrix} = \begin{pmatrix} Y1 \\ Y2 \\ \cdot \\ \cdot \\ \cdot \\ \cdot \\ Y7 \end{pmatrix} \quad \cdots (\text{EXP.8})$$

$$\begin{pmatrix} -1 & -1 & 1 & 1 & 1 & -1 & 1 \\ 1 & -1 & -1 & 1 & 1 & 1 & -1 \\ -1 & 1 & -1 & -1 & 1 & 1 & 1 \\ 1 & -1 & 1 & -1 & -1 & 1 & 1 \\ 1 & 1 & -1 & 1 & -1 & -1 & 1 \\ 1 & 1 & 1 & -1 & 1 & -1 & -1 \\ -1 & 1 & 1 & 1 & -1 & 1 & -1 \end{pmatrix} \begin{pmatrix} -1 & 1 & -1 & 1 & 1 & 1 & -1 \\ -1 & -1 & 1 & -1 & 1 & 1 & 1 \\ 1 & -1 & -1 & 1 & -1 & 1 & 1 \\ 1 & 1 & -1 & -1 & 1 & -1 & 1 \\ 1 & 1 & 1 & -1 & -1 & 1 & -1 \\ -1 & 1 & 1 & 1 & -1 & -1 & 1 \\ 1 & -1 & 1 & 1 & 1 & -1 & -1 \end{pmatrix} \begin{pmatrix} C1 \\ C2 \\ \cdot \\ \cdot \\ \cdot \\ \cdot \\ C7 \end{pmatrix} = \begin{pmatrix} -1 & -1 & 1 & 1 & 1 & -1 & 1 \\ 1 & -1 & -1 & 1 & 1 & 1 & -1 \\ -1 & 1 & -1 & -1 & 1 & 1 & 1 \\ 1 & -1 & 1 & -1 & -1 & 1 & 1 \\ 1 & 1 & -1 & 1 & -1 & -1 & 1 \\ 1 & 1 & 1 & -1 & 1 & -1 & -1 \\ -1 & 1 & 1 & 1 & -1 & 1 & -1 \end{pmatrix} \begin{pmatrix} Y1 \\ Y2 \\ \cdot \\ \cdot \\ \cdot \\ \cdot \\ Y7 \end{pmatrix} \quad \cdots (\text{EXP.9})$$

$$\begin{pmatrix} 7 & -1 & -1 & -1 & -1 & -1 & -1 \\ -1 & 7 & -1 & -1 & -1 & -1 & -1 \\ -1 & -1 & 7 & -1 & -1 & -1 & -1 \\ -1 & -1 & -1 & 7 & -1 & -1 & -1 \\ -1 & -1 & -1 & -1 & 7 & -1 & -1 \\ -1 & -1 & -1 & -1 & -1 & 7 & -1 \\ -1 & -1 & -1 & -1 & -1 & -1 & 7 \end{pmatrix} \begin{pmatrix} C1 \\ C2 \\ \cdot \\ \cdot \\ \cdot \\ \cdot \\ C7 \end{pmatrix} = \begin{pmatrix} -1 & -1 & 1 & 1 & 1 & -1 & 1 \\ 1 & -1 & -1 & 1 & 1 & 1 & -1 \\ -1 & 1 & -1 & -1 & 1 & 1 & 1 \\ 1 & -1 & 1 & -1 & -1 & 1 & 1 \\ 1 & 1 & -1 & 1 & -1 & -1 & 1 \\ 1 & 1 & 1 & -1 & 1 & -1 & -1 \\ -1 & 1 & 1 & 1 & -1 & 1 & -1 \end{pmatrix} \begin{pmatrix} Y1 \\ Y2 \\ \cdot \\ \cdot \\ \cdot \\ \cdot \\ Y7 \end{pmatrix} \quad \cdots (\text{EXP.10})$$

$7C_1 - C_2 - C_3 - C_4 - C_5 - C_6 - C_7 \approx 7C_1 = -Y1 - Y2 + Y3 + Y4 + Y5 - Y6 + Y7 \quad \cdots (\text{EXP.11})$ FIG. 12
(a)
Inversion occurs in 2 Phases
(Period of the same data = 2 phases,
polarities of even-numbered vectors
of the same data are inverted)
(b)
Inversion occurs in 1 Phase
(Period of the same data = 2 phases,
polarities of the same data are always identical)
(c)
Inversion occurs in 1 phase
(Period of one data = 1 phase,
polarities of even-numbered phases
of the same data are inverted)

F I G. 1 8
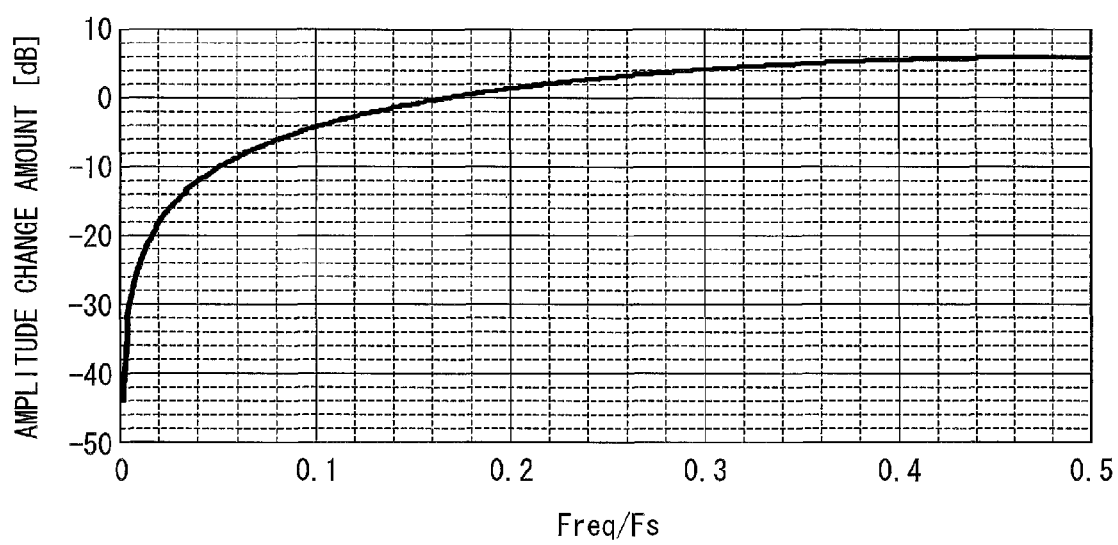

F I G. 2 0
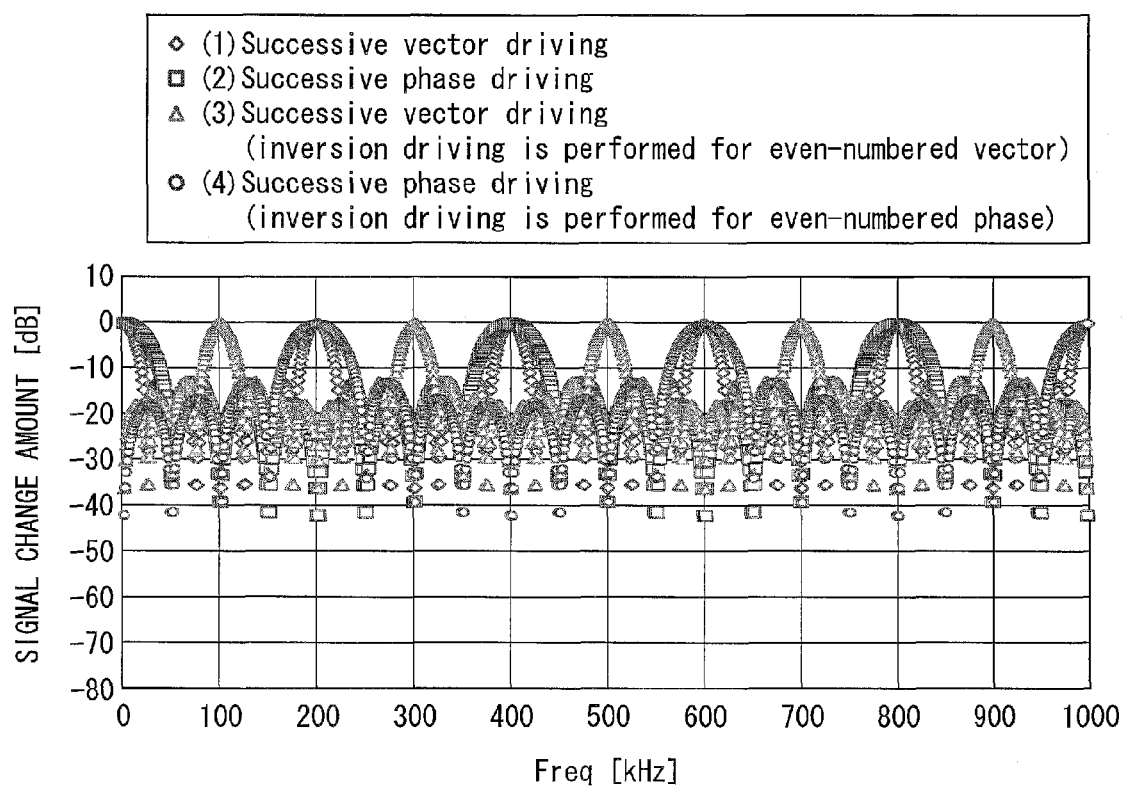

F I G. 2 3
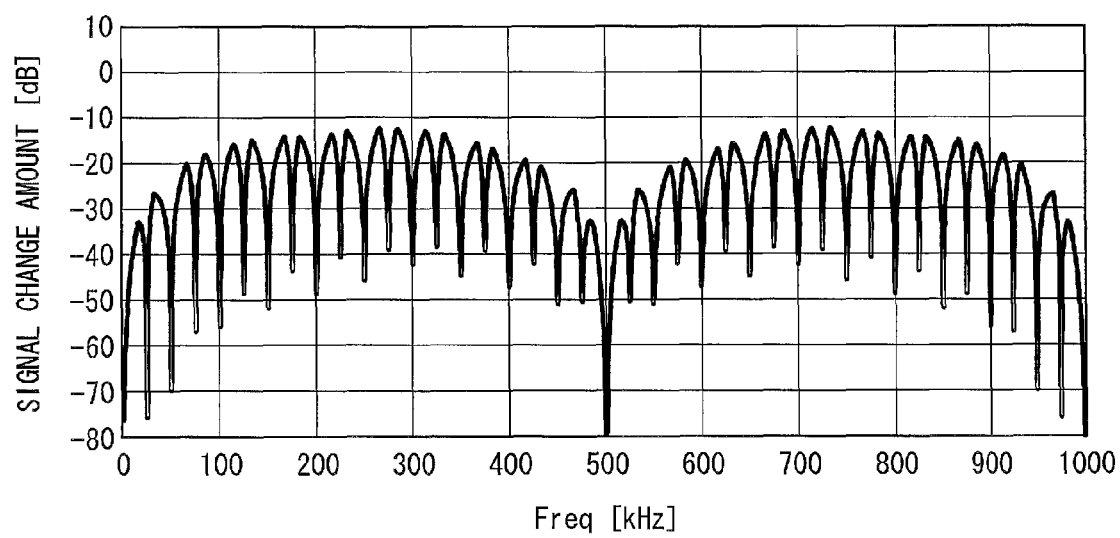

| Operating mode | Time interval for obtaining data for average processing | Obtained data | Frequency having unfavorable attenuation characteristic |
|---|---|---|---|
| (0) When phase/vector driving is not successively performed | 1frame | All polarities are identical | 1/frame*N |
| (1) When vector driving is successively performed | 2phase | All polarities are identical | 1/2phase*N |
| (2) When phase driving is also successively performed | 1phase | All polarities are identical | 1/1phase*N |
| (3) While vector driving is successively performed, inversion driving is performed for the even-numbered driving | 2phase−ΔT(*) | Polarities of even-numbered data are inverted | 1/(2phase−ΔT)*(N+0.5) |
| (4) While phase driving is successively performed, inversion driving is performed for the even-numbered driving | 1phase−ΔT(*) | Polarities of even-numbered data are inverted | 1/(1phase−ΔT)*(N+0.5) |
| (5) When inversion driving is performed for Phase1 | 2phase−2ΔT(*) | Polarities of phase0 are identical Polarities of phase1 are all inverted | 1/(2phase−2ΔT)*N |
| (6) When phase/vector driving is not successively performed and inversion driving is performed for the even-numbered driving | 1frame | Polarities of even-numbered data are inverted | 1/frame*(N+0.5) |

(b)

| | Obtaining interval [μsec] | Frequency [kHz] | Unfavorable frequency point | | | |
|---|---|---|---|---|---|---|
| | | | N=0 | N=1 | N=2 | N=3 |
| (0) | 315.0 | 3.17 | 0 | 3kHz | 6kHz | 10kHz |
| (1) | 5.0 | 200.00 | 0 | 200kHz | 400kHz | 600kHz |
| (2) | 2.5 | 400.00 | 0 | 400kHz | 800kHz | 1200kHz |
| (3) | 4.5 | 222.22 | 111kHz | 333kHz | 556kHz | 778kHz |
| (4) | 2.0 | 500.00 | 250kHz | 750kHz | 1250kHz | 1750kHz |
| (5) | 4.0 | 250.00 | 0 | 250kHz | 500kHz | 750kHz |
| (6) | 315.0 | 3.17 | 2kHz | 5kHz | 8kHz | 11kHz |

Number of vectors = 63

1phase = 2.5 μsec

ΔT = 0.5 μsec

SIGNAL PROCESSING SYSTEM, TOUCH PANEL CONTROLLER, TOUCH PANEL SYSTEM USING SAME, AND ELECTRONIC DEVICE

TECHNICAL FIELD

The present invention relates to (i) a signal processing system which performs addition- and subtraction-based signal processing on a plurality of time-series signals which are sampled at a discrete time and are derived from a linear element, to estimate a value or an input of the linear element, (ii) a touch panel controller which controls a touch panel including a plurality of electrostatic capacitors provided at respective intersections where a plurality of drive lines and a plurality of sense lines intersect with each other, (iii) a touch panel system using the touch panel controller, and (iv) an electronic apparatus using the touch panel controller.

BACKGROUND ART

The inventors have proposed a touch panel controller which controls a touch panel having a plurality of electrostatic capacitors provided at respective intersections where a plurality of drive lines and a plurality of sense lines intersect with each other, to estimate or detect capacitance values of respective electrostatic capacitors which are provided in a matrix manner (see Patent Literature 1).

This touch panel controller drives in parallel a plurality of drive lines on a basis of a code sequence, performs sampling, at a discrete time, on linear sum signals based on electrical charge stored in the electrostatic capacitors, reads the sampled linear sum signals along the sense lines, and then estimates or detects capacitance values of respective electrostatic capacitors through inner product operation between the read linear sum signal and the code sequence.

CITATION LIST

Patent Literature
Patent Literature 1
Japanese Patent Application, Tokugan, No. 2011-130604 (Filing Date: Jun. 10, 2011)

SUMMARY OF INVENTION

Technical Problem

However, the above-described conventional technique has a problem that noise is mixed in each of the linear sum signals sampled at a discrete time, the capacitance values of the respective electrostatic capacitors are not inaccurately estimated or detected, thus making it difficult to favorably operate a touch panel controller.

An object of the present invention is to reduce noise present in a result of estimation of a value or an input of a linear element, which estimation is performed by addition- and subtraction-based signal processing on a basis of a frequency of noise mixed in each of a plurality of time-series signals which are sampled at a discrete time and are derived from the linear element, the amount of that noise, and the input-output transfer characteristics.

Solution to Problem

In order to attain the object, a signal processing system according to an aspect of the present invention is a signal processing system which performs addition- and subtraction-based signal processing on a plurality of time-series signals which are sampled at a discrete time and are derived from a linear element, to estimate a value or an input of the linear element, the signal processing system including: first and second subsystems which have different input-output transfer characteristics; and a switching circuit which switches between the first subsystem and the second subsystem and then connects one of the first and second subsystems to the linear element, to reduce noise present in a result of estimation of the value or input of the linear element, which estimation is performed by the addition- and subtraction-based signal processing, on a basis of a frequency of noise mixed in each of the time-series signals, an amount of that noise, and the input-output transfer characteristics.

A touch panel controller according to the present invention is a touch panel controller which controls a touch panel including a plurality of electrostatic capacitors provided at respective intersections where a plurality of drive lines and a plurality of sense lines intersect with each other, the touch panel controller including: a driving circuit which drives the electrostatic capacitors along the drive lines; an amplifier circuit which (i) reads, along the sense lines, a plurality of linear sum signals based on respective ones of the electrostatic capacitors which are driven by the driving circuit and (ii) then amplifies the linear sum signals thus read; an analog-to-digital conversion circuit which performs analog-to-digital conversion on outputs of the amplifier circuit; a decoding operation circuit which estimates respective capacitance values of the electrostatic capacitors on a basis of respective ones of the outputs having been fed from the amplifier circuit and then subjected to the analog-to-digital conversion; first and second subsystems which have different input-output transfer characteristics; and a switching circuit which switches between the first subsystem and the second subsystem and then connects one of the first and second subsystems to the driving circuit, to reduce noise present in a result of estimation of respective values of the electrostatic capacitors, which estimation is performed by the addition- and subtraction-based signal processing performed by the decoding operation circuit, on a basis of a frequency of noise mixed in each of the linear sum signals, an amount of that noise, and the input-output transfer characteristics.

A touch panel system according to the present invention is a touch panel system, including: a touch panel which includes a plurality of electrostatic capacitors provided at respective intersections where a plurality of drive lines and a plurality of sense lines intersect with each other; and a touch panel controller which controls the touch panel, the touch panel controller including: a driving circuit which drives the electrostatic capacitors along the drive lines; an amplifier circuit which (i) reads, along the sense lines, a plurality of linear sum signals based on respective ones of the electrostatic capacitors which are driven by the driving circuit and (ii) then amplifies the linear sum signals thus read; an analog-to-digital conversion circuit which performs analog-to-digital conversion on outputs of the amplifier circuit; a decoding operation circuit which estimates respective capacitance values of the electrostatic capacitors on a basis of respective ones of the outputs having been fed from the amplifier circuit and then subjected to the analog-to-digital conversion; first and second subsystems which have different input-output transfer characteristics; and a switching circuit which switches between the first subsystem and the second subsystem and then connects one of the first and second subsystems to the driving circuit, to reduce noise present in a result of estimation of respective values of the electrostatic capacitors, which estimation is performed by the addition- and subtraction-based signal processing performed by the decoding operation circuit, on a basis of a frequency of noise mixed in each of the linear sum signals, an amount of that noise, and the input-output transfer characteristics.

An electronic apparatus according to the present invention includes: a touch panel system according to the present invention; and a display section which corresponds to the touch panel system.

Advantageous Effects of Invention

An aspect of the present invention has an advantageous effect of reducing noise present in a result of estimation of a value or an input of the linear element, which estimation is performed by addition- and subtraction-based signal processing on a basis of a frequency of noise mixed in each of a plurality of time-series signals which are sampled at a discrete time and are derived from the linear element, the amount of that noise, and the input-output transfer characteristics.

BRIEF DESCRIPTION OF DRAWINGS

FIG. 5 is a diagram for explaining numeral expressions illustrating a driving method of the touch panel system.

FIG. 8 is a diagram for explaining numerical expressions each of which represents the parallel driving method provided in the touch panel system.

FIG. 9 is a diagram for explaining numerical expressions each of which represents a method of performing parallel driving in the touch panel system on a basis of an M-sequence code.

Figure 11:
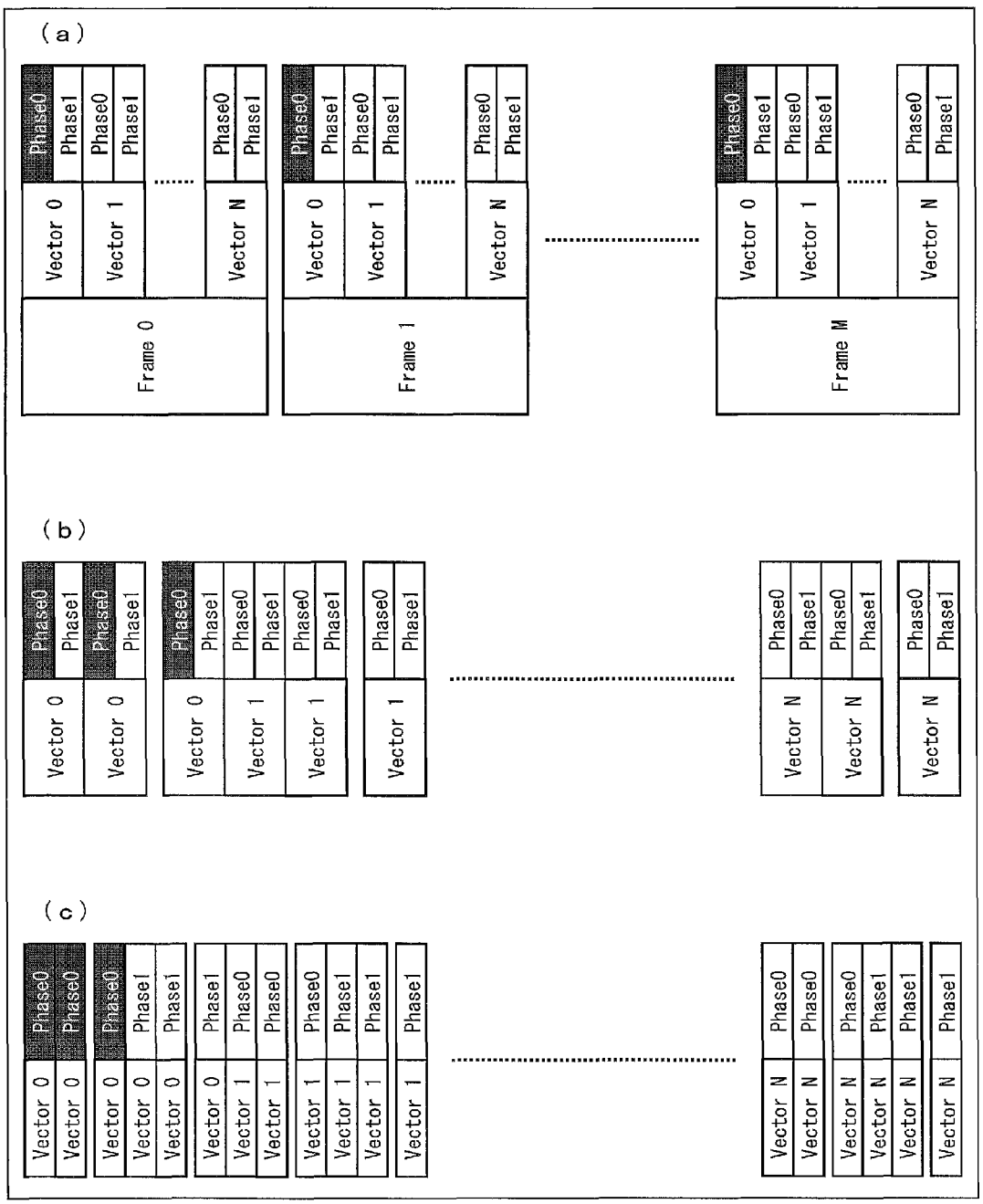

(a), (b), and (c) of FIG. 11 are each a diagram for explaining a unit of drivings performed on the electrostatic capacitors in the other touch panel system.

(a), (b), and (c) of FIG. 12 are each a diagram for explaining a method of inversely driving each of the plurality of electrostatic capacitors in the other touch panel system.

Figure 13:
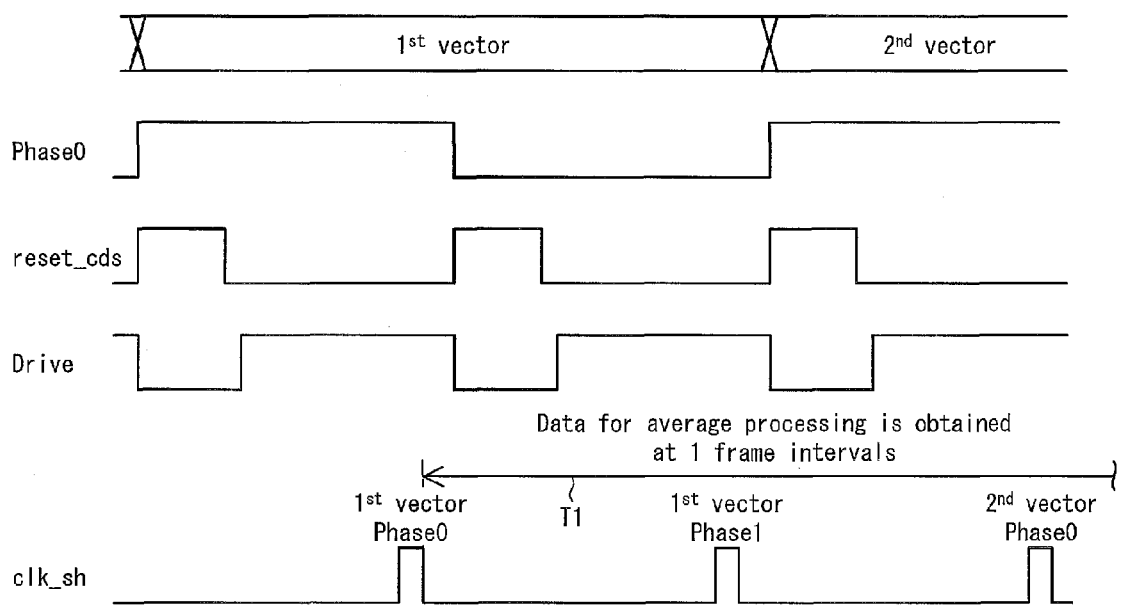

FIG. 13 is a waveform chart of a driving signal and other signals when driving is performed based on the $1^{st}$ vector, and then driving is performed based on the $2^{nd}$ vector by the other tough panel system.

Figure 14:
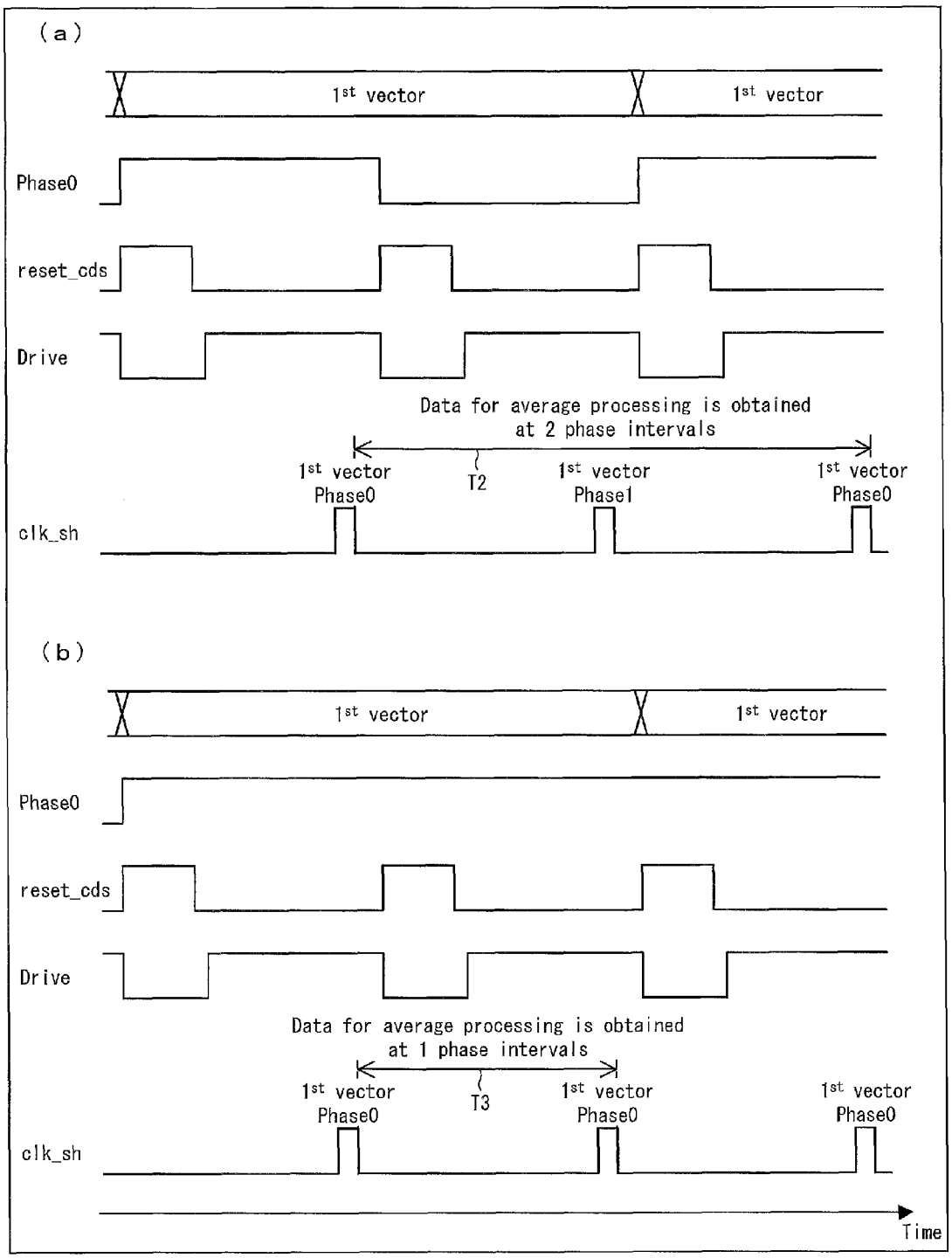

(a) of FIG. 14 is a waveform chart of a driving signal and other signals when the driving based on the $1^{st}$ vector is successively performed by the other touch panel system (b) of FIG. 14 is a waveform chart of a driving signal and other signals when driving based on Phase0 of the $1^{st}$ vector is successively performed.

Figure 15:
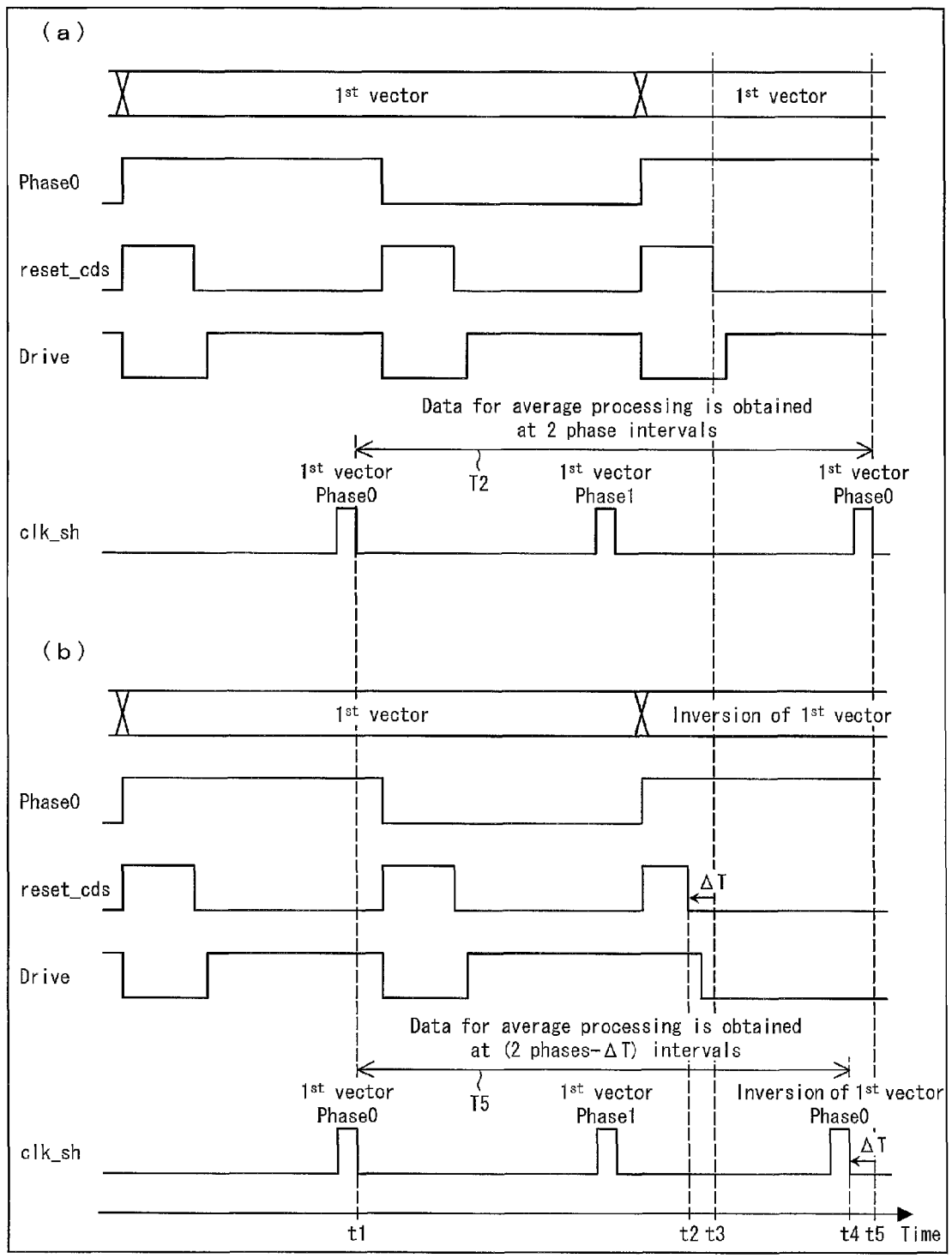

(a) of FIG. 15 is a waveform chart of a driving signal and other signals when driving based on the $1^{st}$ vector is succes-sively performed by the other touch panel system. (b) of FIG. 15 is a waveform chart of a driving signal and other signals in case where the driving based on the $1^{st}$ vector at an even-numbered time is inverted.

Figure 16:
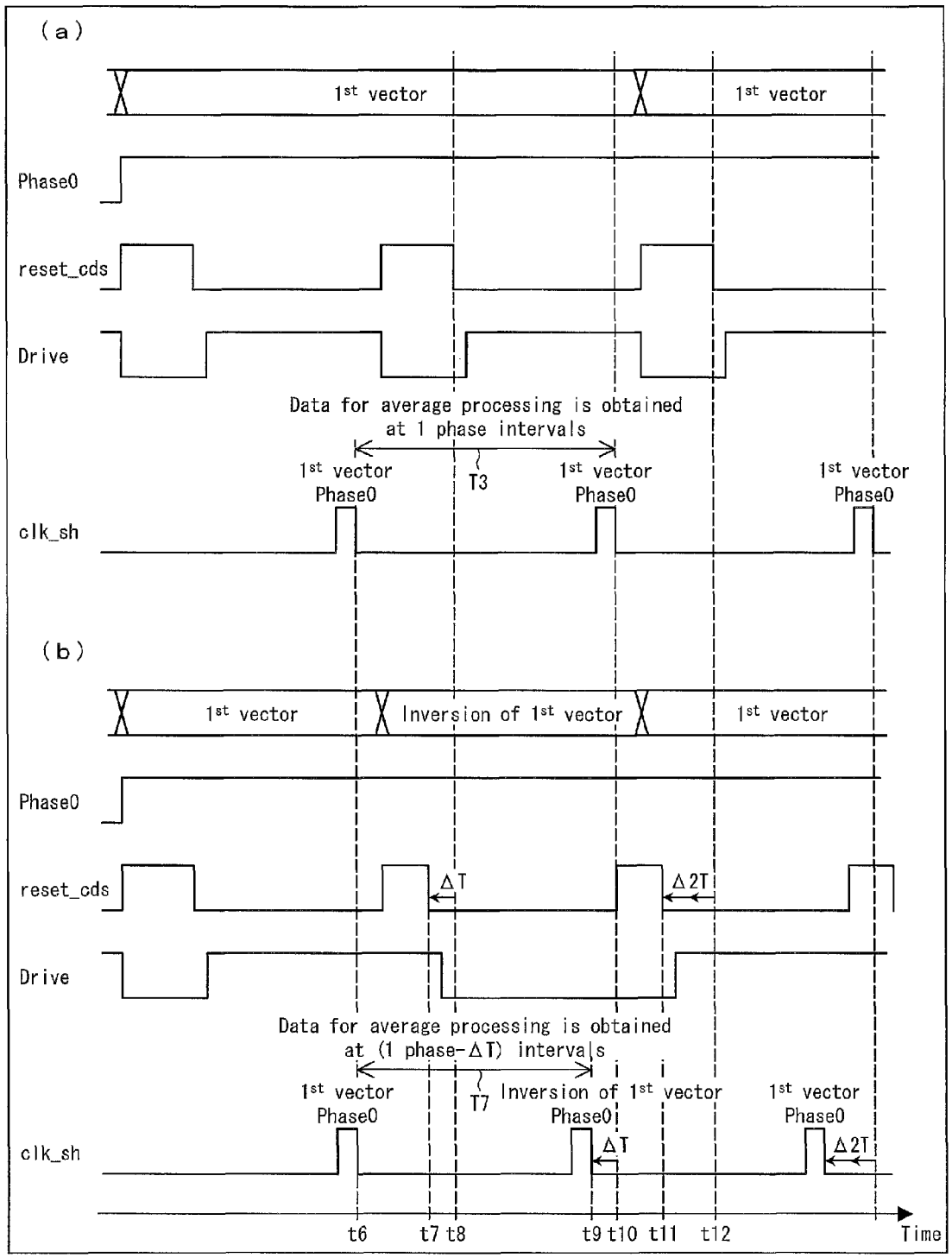

(a) of FIG. 16 is a waveform chart of a driving signal and other signals when driving based on Phase0 of the $1^{st}$ vector is successively performed. (b) of FIG. 16 is a waveform chart of a driving signal, for example, when driving based on Phase0 of the $1^{st}$ vector at an even-numbered time is inverted.

Figure 17:
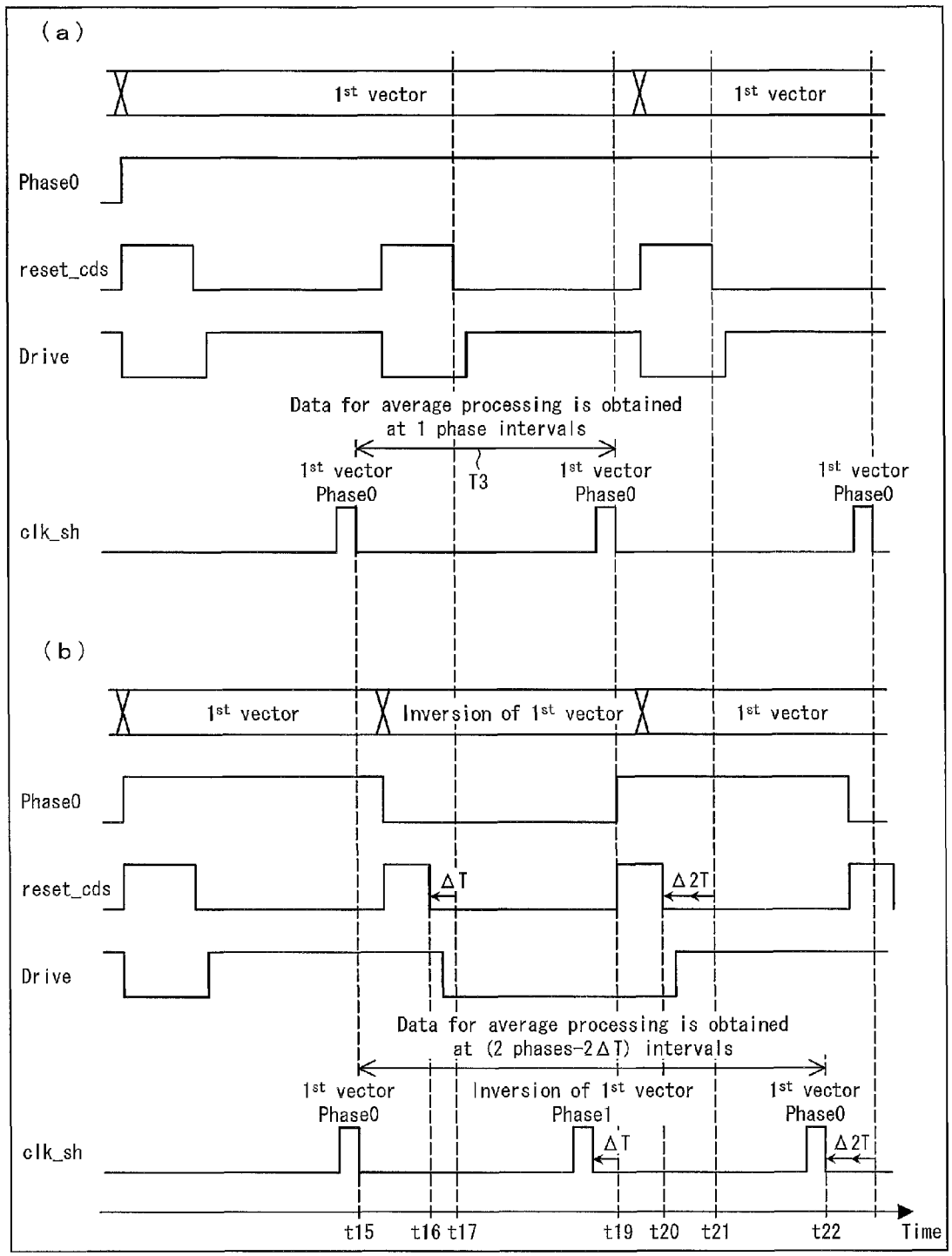

(a) of FIG. 17 is a waveform chart of a driving signal and other signals when driving based on Phase0 of the $1^{st}$ vector is successively performed. (b) of FIG. 17 is a waveform chart of a driving signal and other signals when driving based on Phase1 of the $1^{st}$ vector is inverted.

FIG. 18 is a graph illustrating a frequency characteristic of CDS (correlated double sampling) in the other touch panel system.

Figure 19:
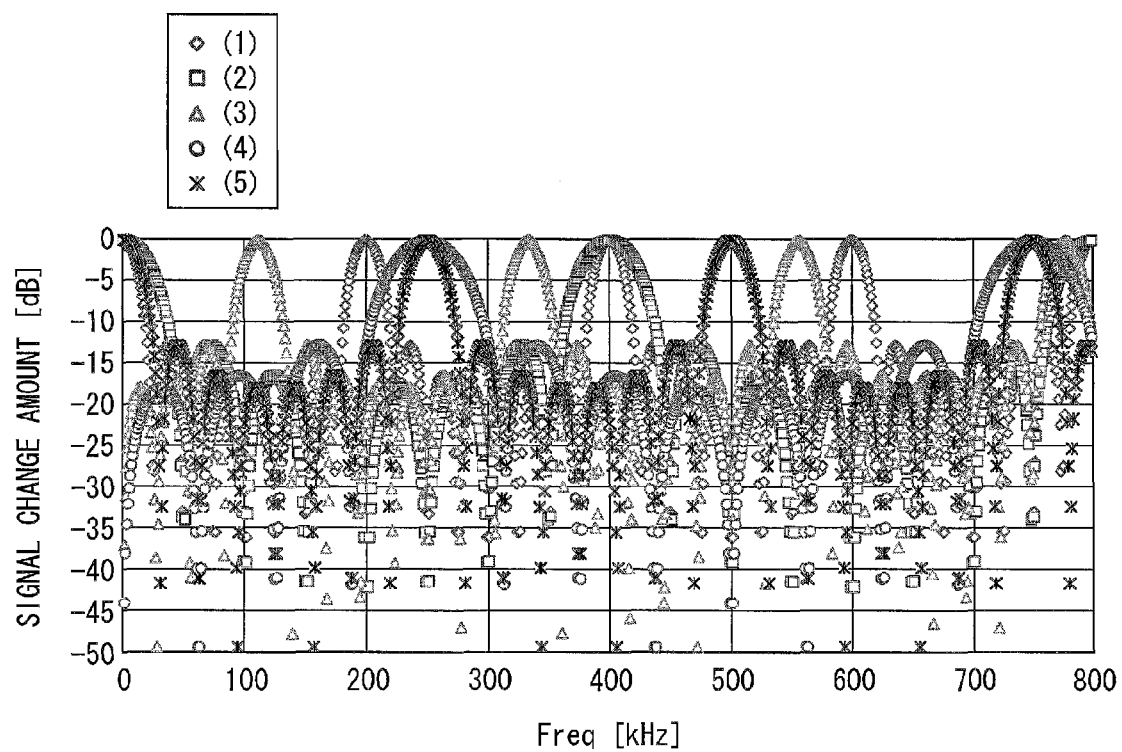

FIG. 19 is a graph illustrating a frequency characteristic of an octuple sampling by the other touch panel system.

FIG. 20 is a graph illustrating a frequency characteristic of another octuple sampling by the other touch panel system.

Figure 21:
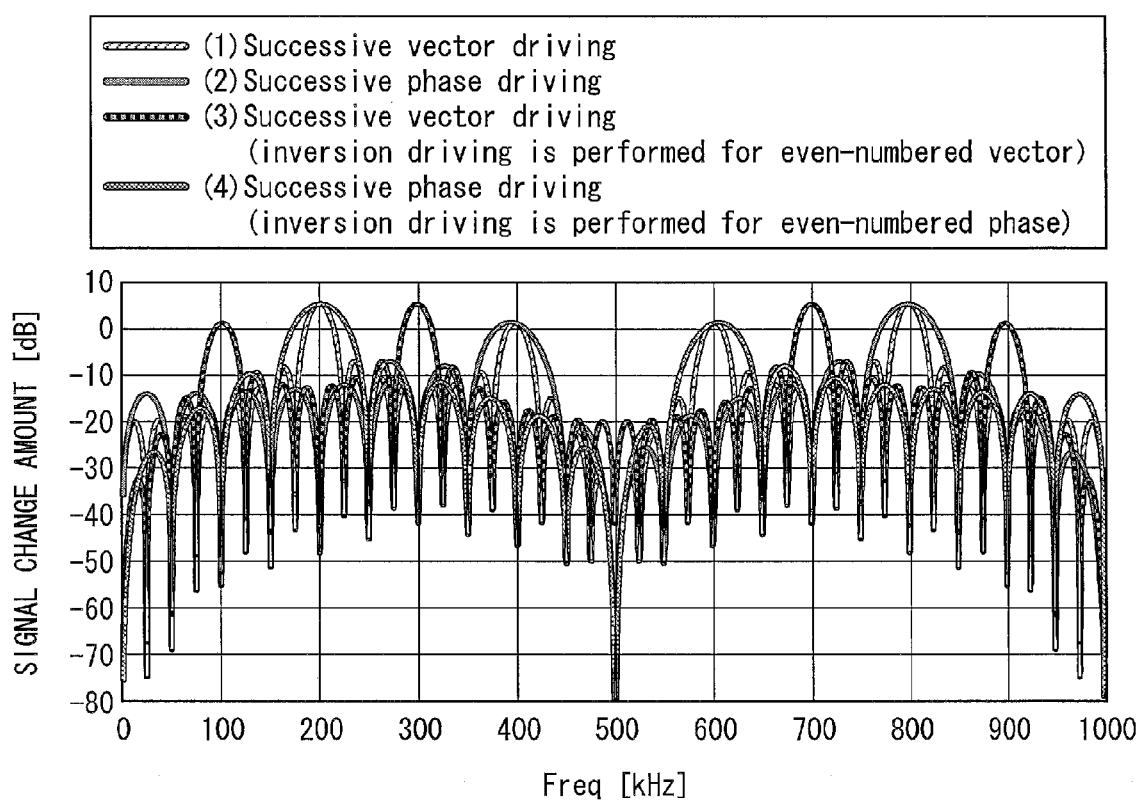

FIG. 21 is a graph illustrating a frequency characteristic of a still another octuple sampling by the other touch panel system.

Figure 22:
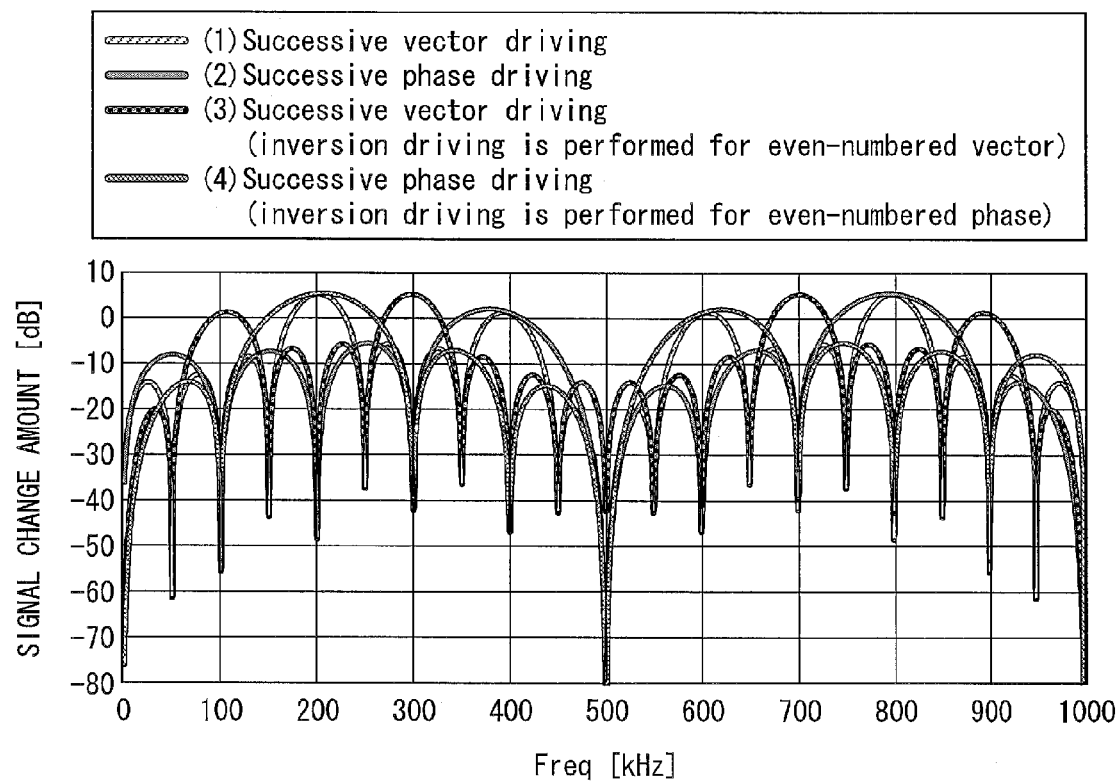

FIG. 22 is a graph illustrating a frequency characteristic of quadruple sampling by the other touch panel system.

FIG. 23 is a graph illustrating a frequency characteristic of a still another octuple sampling by the other touch panel system.

Figure 24:
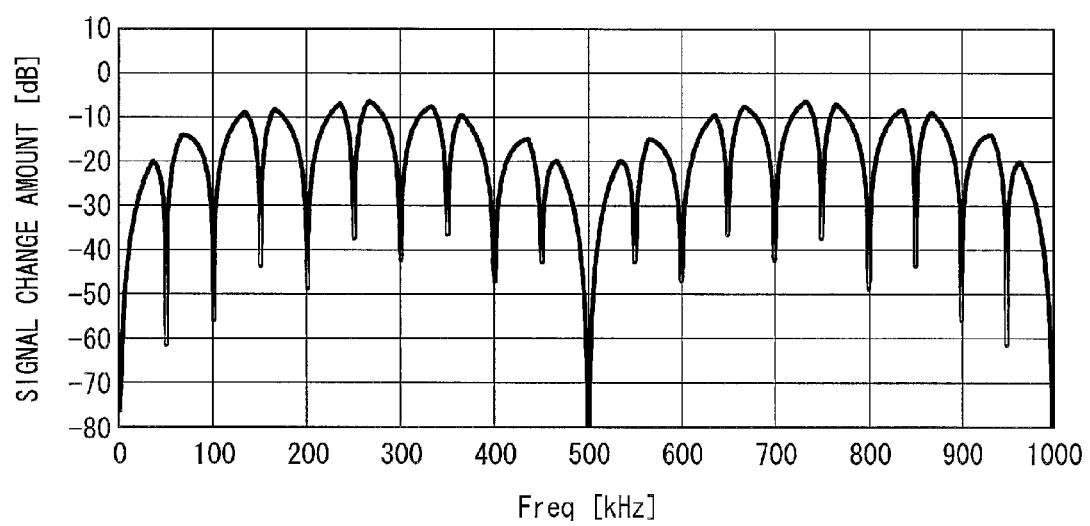

FIG. 24 is a graph illustrating a frequency characteristic of another quadruple sampling by the other touch panel system.

(a), and (b) of FIG. 25 are each a diagram for comparison between the driving methods of the other touch panel system.

Figure 26:
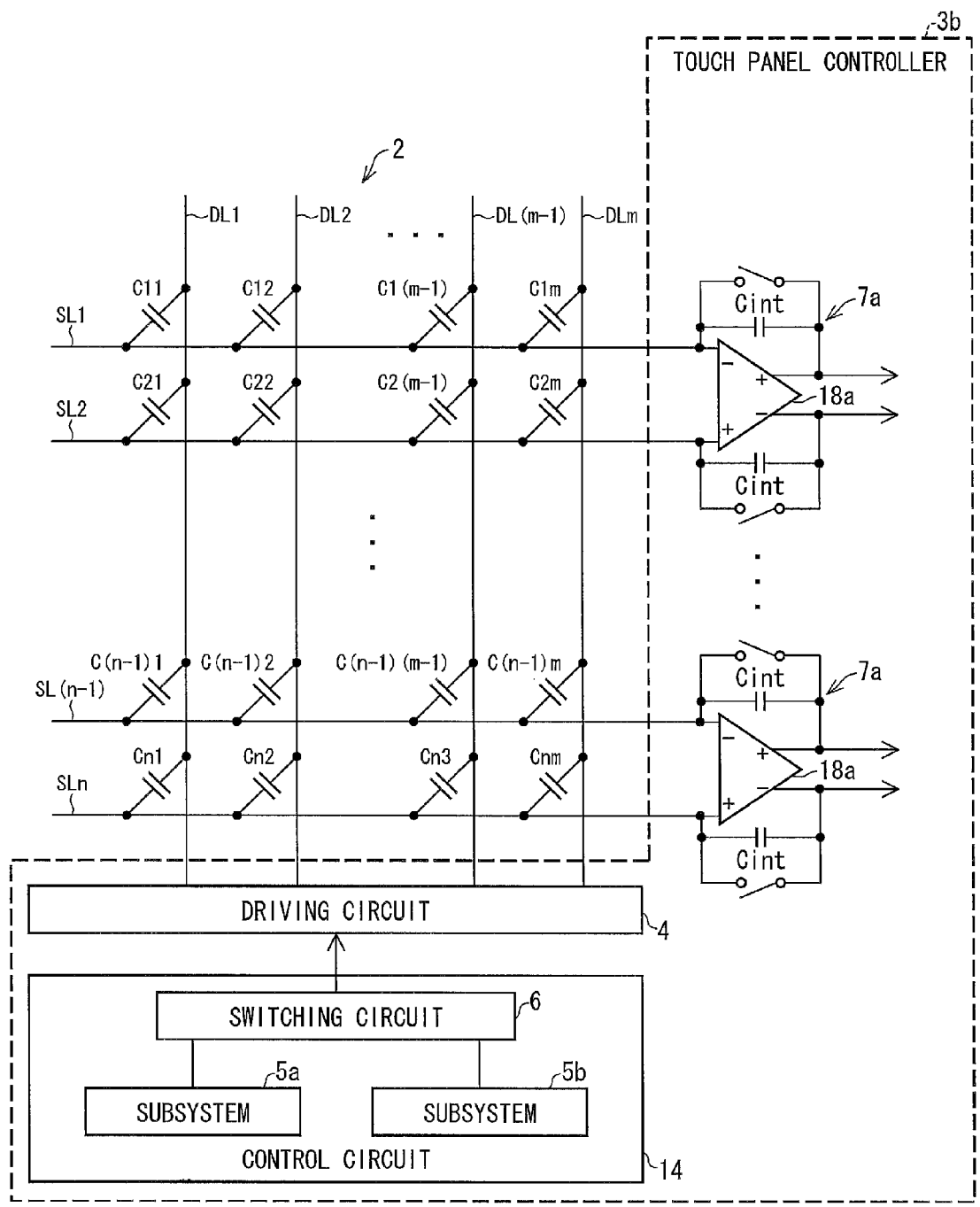

FIG. 26 is a circuit diagram illustrating a configuration of a touch panel system according to Embodiment 2.

Figure 27:
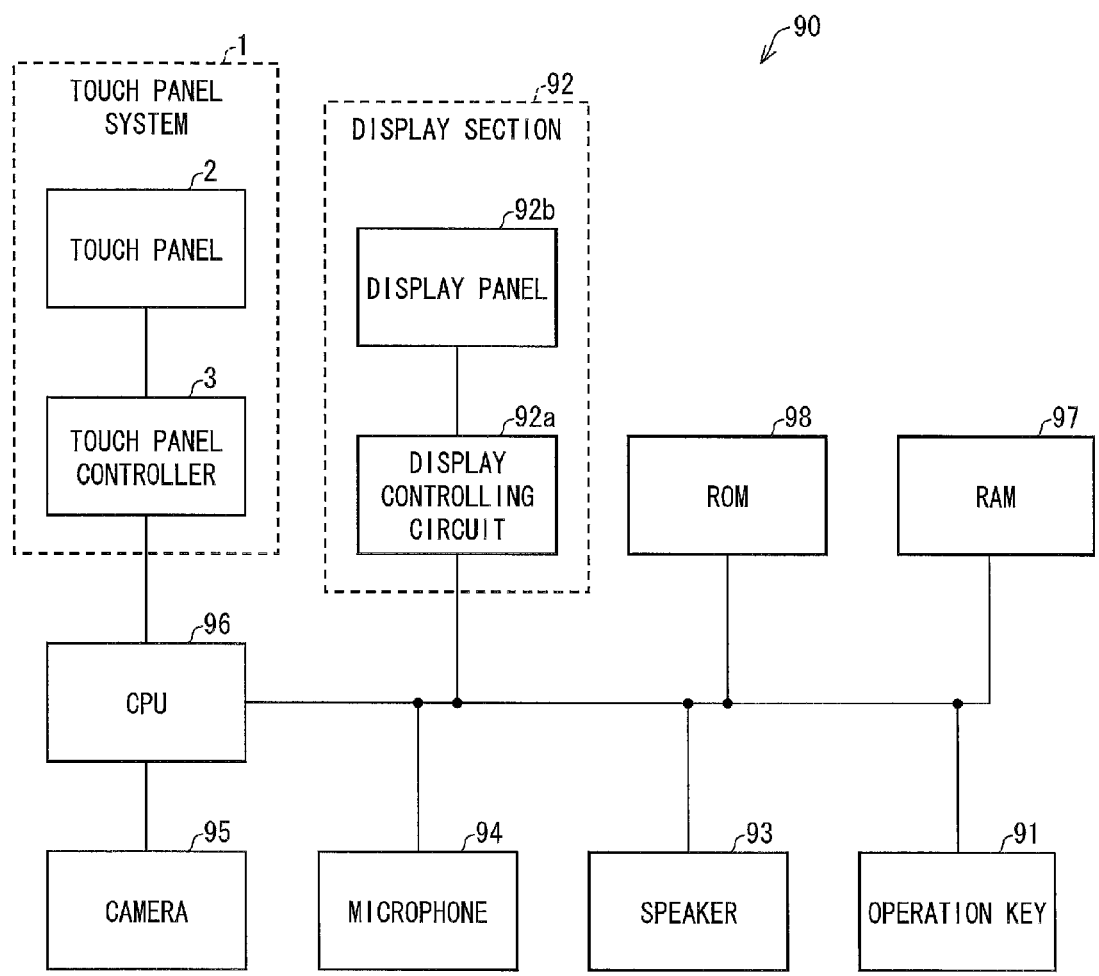

FIG. 27 is a block diagram illustrating a configuration of an electronic apparatus according to Embodiment 3

DESCRIPTION OF EMBODIMENTS

Embodiment 1

The following describes in detail embodiments of the present invention.

(Configuration of Signal Processing System 10)

Figure 1:
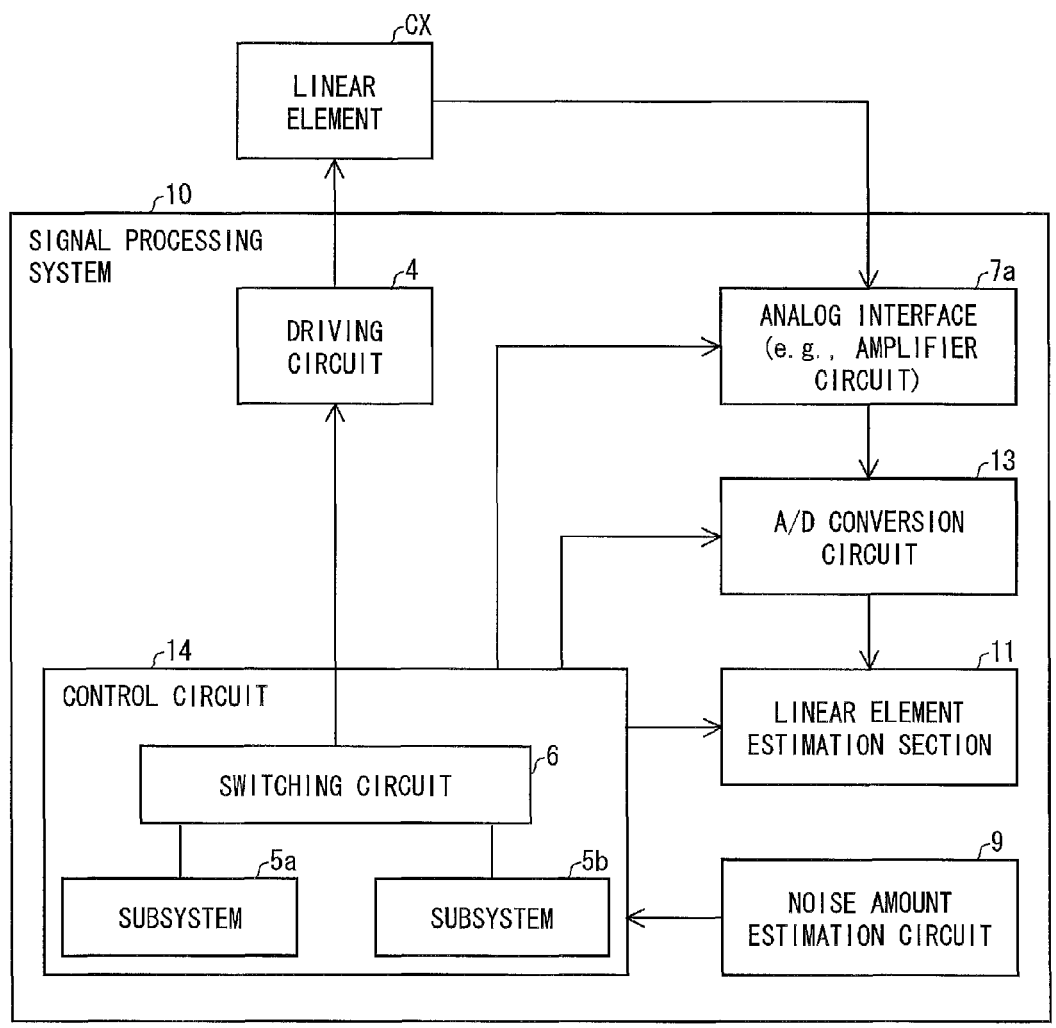
FIG. 1 is a block diagram illustrating a configuration of a signal processing system according to Embodiment 1.

FIG. 1 is a block diagram illustrating a configuration of a signal processing system 10 according to Embodiment 1. The signal processing system 10 includes a driving circuit 4 which drives a linear element CX and a control circuit 14 which controls the driving circuit 4.

The control circuit 14 includes subsystems 5a and 5b which have different input-output transfer characteristics, and a switching circuit 6 which connects one of the subsystems 5a and 5b to the driving circuit 4.

The linear element CX is driven by the driving circuit which is controlled by the subsystem 5a or the subsystem 5b, and feeds, to an analog interface 7a (e.g., amplifier circuit), time-series signals each of which can be observed successively or discretely and has a value which changes every moment. The analog interface 7a amplifies the time-series signals and then outputs the time-series signals thus amplified to an A/D (analog-to-digital) conversion circuit 13. The AD conversion circuit 13 AD-converts each of the time-series signals fed from the analog interface 7a and then feeds, to a linear element estimation section 11, the plurality of time-series signals which are sampled at a discrete time and change every moment. The linear element estimation section 11 performs addition- and subtraction-based signal processing on the plurality of AD-converted time-series signals based on the linear element CX to estimate values of the linear element CX or an input of the linear element CX. The signal processing system 10 is provided with a noise amount estimation circuit 9 which estimates the amount of noise mixed in each of the time-series signals from a plurality of estimates of values or input values, which are obtained by the linear element estimation section 11, of the linear element CX.

The switching circuit 6 switches between the subsystems 5a and 5b and then connects one of the subsystems 5a and 5b to the driving circuit 4, in order to reduce noise present in a result of estimation of a value or an input of the linear element CX by addition- and subtraction-based signal processing performed on a basis of a frequency and amount of noise which is mixed in each of the time-series signals, and the input-output transfer characteristics.

The control circuit 14 controls the analog interface circuit 7a. For example, the control circuit 14 controls a signal which corresponds to an even-numbered phase driving and an odd-numbered phase driving which switch the input state of the amplifier circuit. Moreover, the control circuit 14 controls a sampling frequency and the number of multiple samplings of the A/D conversion circuit 13. Furthermore, the control circuit 14 controls an operation of the linear element estimation section 11.

There can be a difference between (i) the number of multiple samplings of each of the time-series signals from the linear element CX based on the subsystem 5a and (ii) the number of multiple samplings of each of the time-series signals from the linear element CX based on the subsystem 5b. There can be a difference between (i) the sampling frequency of each of the time-series signals from the linear element CX based on the subsystem 5a and (ii) the sampling frequency of each of the time-series signals from the linear element CX based on the subsystem 5b.

The polarities of respective codes of the plurality of time-series signals from the linear element CX based on the subsystems 5a and 5b can be inverted in time sequence. Moreover, the polarities of respective codes of the plurality of time-series signals based on the subsystems 5a and 5b can be identical along a time series.

The switching circuit 6 switches between the subsystems 5a and 5b based on an estimation result of the noise amount estimation circuit 9.

The linear element CX can be an electrostatic capacitor, for example. The linear element CX can also be a thermometer equipped with a thermocouple. In this case, the signal processing system 10 is established without the driving circuit 4. It is possible to achieve a configuration in which a minute voltage (minute current) which can be observed through a thermocouple is amplified by an amplifier circuit, sampling is then performed by the A/D conversion circuit 13 with a varying multiplicity of multiple samplings and a varying sampling frequency so that noise can be reduced.

(Noise Amount and Frequency Characteristic Between Sampling Frequency and Amplitude Change Amount)

Figure 2:
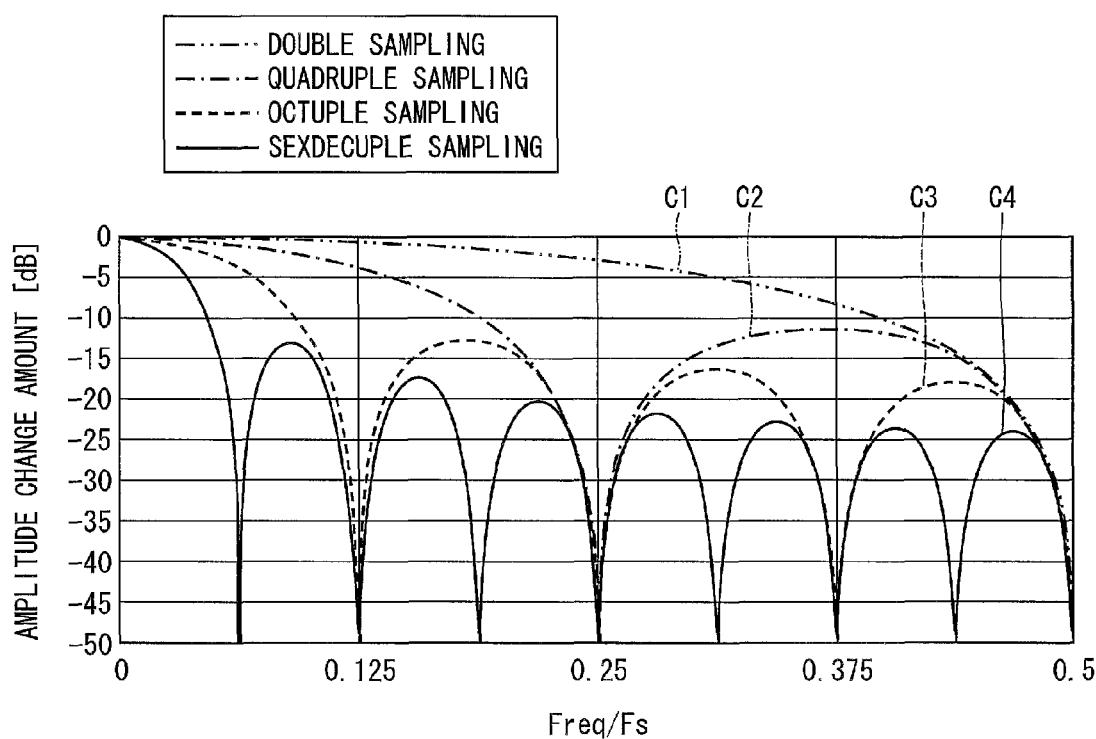
FIG. 2 is a graph illustrating (i) the amount of noise in each of the time-series signals processed by the signal processing system and (ii) a frequency characteristic between the sampling frequency and the amplitude change amount of each of the time-series signals.

FIG. 2 is a graph illustrating (i) the amount of noise in each of the time-series signals processed by the signal processing system 10 and (ii) a frequency characteristic between the sampling frequency and the amplitude change amount of each of the time-series signals. The horizontal axis indicates a normalization coefficient which is a ratio of a signal frequency to a sampling frequency. The vertical axis indicates the amplitude change amount of a signal.

A characteristic C1 indicates a frequency characteristic of a double sampling which provides a simple moving average by performing sampling of two signals. A characteristic C2 indicates a frequency characteristic of a quadruple sampling which provides a simple moving average by performing sampling of four signals. A characteristic C3 indicates a frequency characteristic of an octuple sampling which provides a simple moving average by performing sampling of eight signals. Moreover, a characteristic C4 indicates a frequency characteristic of a sexdecuple sampling which provides a simple moving average by performing sampling of 16 signals.

From the graph of these frequency characteristics, the double sampling shows (see the characteristic C1) that when the normalization coefficient is 0.5, the amplitude change amount is $-\infty$ dB. Therefore, it is possible to eliminate noise when the sampling frequency is set to double the noise frequency. It is possible to reduce noise when the sampling frequency is changed so that the normalization frequency is closer to 0.5.

The quadruple sampling shows (see the characteristic C2) that when the normalization coefficient is 0.5 and 0.25, the amplitude change amount is $-00$ dB. Therefore, it is possible to eliminate noise when the sampling frequency is set to double or quadruple the noise frequency. Moreover, it is possible to reduce noise when the sampling frequency is changed so that the normalization frequency is closer to 0.5 or 0.25.

The octuple sampling shows (see the characteristic C3) that when the normalization coefficient is 0.5, 0.375, 0.25, and 0.125, the amplitude change amount is $-\infty$ dB.

Therefore, it is possible to eliminate noise when the sampling frequency is set to double, 2.67-tuple, quadruple, or octuple the noise frequency. It is possible to reduce noise when the sampling frequency is changed so that the normalization frequency is closer to 0.5, 0.375, 0.25, or 0.125.

The sexdecuple sampling shows (see the characteristic C4) that it is possible to eliminate or reduce noise when the sampling frequency is set or changed.

As described above, it is possible to eliminate or reduce noise when the sampling frequency with respect to the noise frequency is set or changed.

For example, when the normalization frequency is 0.25, the amplitude change amount is $-3$ dB in the double sampling. The amplitude change amount is $-\infty$ dB in the quadruple sampling, the octuple sampling, and the sexdecuple sampling. Therefore, it is possible to eliminate noise when the multiplicity of the multiple sampling is changed such that double sampling is changed to any one of quadruple sampling, octuple sampling, and sexdecuple sampling. It is also possible to eliminate or reduce noise when the multiplicity of the multiple sampling is changed.

Therefore, it is possible to eliminate or reduce noise in such a manner that the sampling frequencies of the plurality of subsystems (see FIG. 1) are set to be different from each other and the multiplicities of the multiple samplings are set to be different from each other, and the switching circuit 6 switches, based on the frequency of noise, to the subsystem having the multiplicity and sampling frequency set so that the amplitude change amount (see FIG. 2) is reduced.

(Configuration of Touch Panel System 1)

Figure 3:
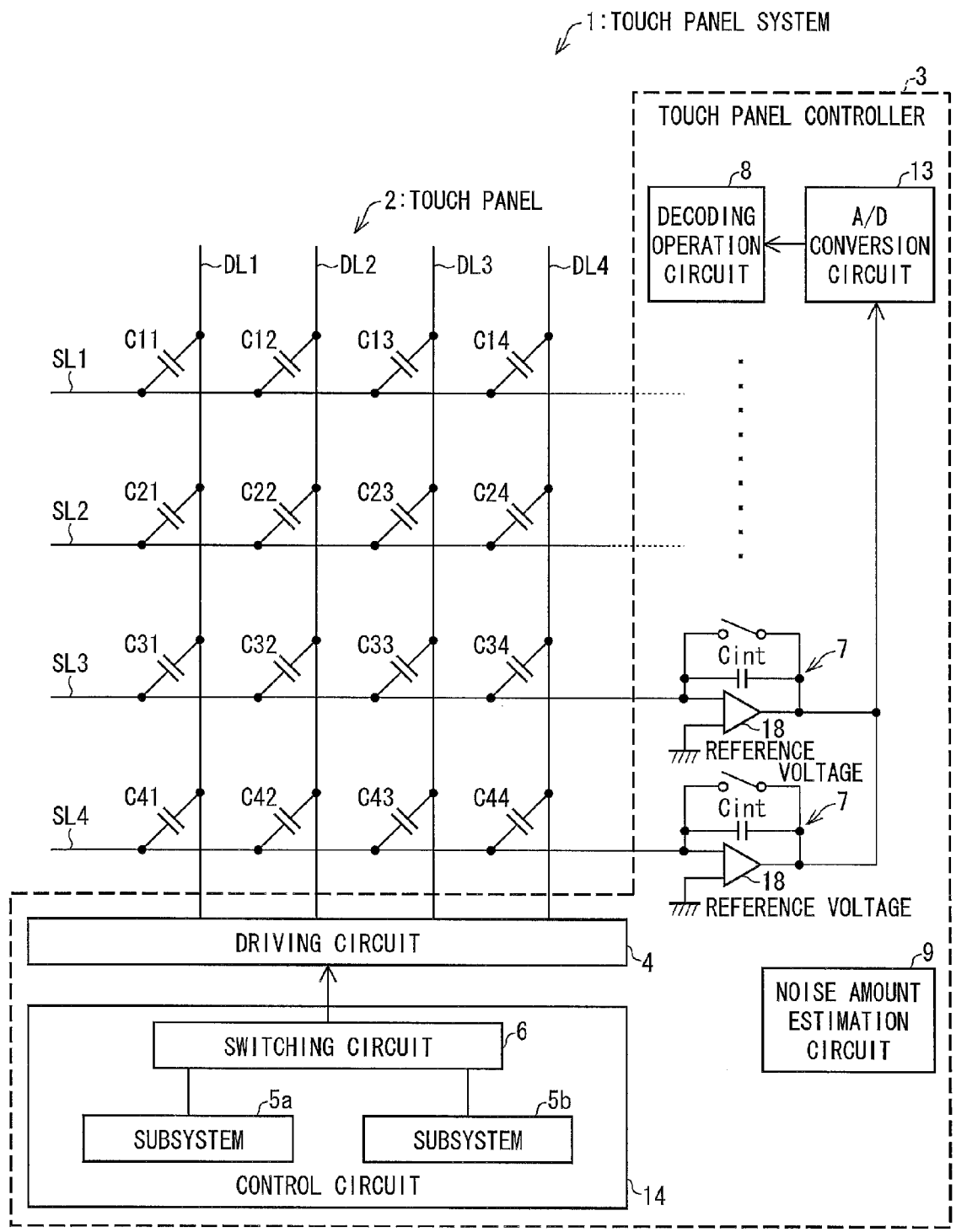
FIG. 3 is a circuit diagram illustrating a configuration of a touch panel system according to Embodiment 1.

FIG. 3 is a circuit diagram illustrating a configuration of a touch panel system 1 according to Embodiment 1. The touch panel system 1 includes a touch panel 2 and a touch panel controller 3. The touch panel 2 includes electrostatic capacitors C11 through C44 which are provided at respective intersections where the drive lines DL1 through DL4 and the sense lines SL1 through SL4 intersect with each other.

The touch panel controller 3 includes a driving circuit 4 which drives the electrostatic capacitors C11 through C44 along the drive lines DL1 through DL4.

The touch panel controller 3 is provided with a plurality of amplifier circuits 7 which are connected to the sense lines SL1 through SL4, respectively. Each of the amplifier circuits 7 reads and amplifies, along the sense lines SL1 through SL4, a plurality of linear sum signals based on electrostatic capacitors C11 through C44 driven by the driving circuit 4. The amplifier circuit 7 includes an amplifier 18, an integral capacitor Cint, and a reset switch, wherein the integral capacitor Cint and the reset switch are connected in parallel to the amplifier 18.

The touch panel controller 3 includes an A/D conversion circuit 13 and a decoding operation circuit 8. The A/D conversion circuit 13 converts the output of the amplifier circuit 7 from analog to digital. The decoding operation circuit 8 estimates the respective values of the electrostatic capacitors C11 through C44 based on the corresponding outputs of the amplifier circuit 7 which outputs are obtained by analog-to-digital conversion.

The touch panel controller 3 includes a control circuit 14 which controls the driving circuit 4. The control circuit 14 includes (i) subsystems 5a and 5b which have different input-output transfer characteristics and (ii) a switching circuit 6 which switches between the subsystems 5a and 5b and then connects one of the subsystems 5a and 5b to the driving circuit 4, in order to reduce noise present in estimates, which are results of estimation performed by the decoding operation circuit 8, of the respective values of the electrostatic capacitors C11 through C44, based on a frequency and amount of noise which is mixed in each of the linear sum signals, and the input-output transfer characteristics.

The control circuit 14 controls a sampling frequency of the A/D conversion circuit 13 and the number of multiple samplings of the A/D conversion circuit 13. Furthermore, the control circuit 14 controls an operation of the decoding operation circuit 8.

The noise amount estimation circuit 9 is provided to estimate the amount of noise present in each of the linear sum signals from an estimate of a corresponding one of the electrostatic capacitors, which estimate is obtained by addition- and subtraction-based signal processing on a corresponding one of the linear sum signals. The switching circuit 6 switches between the subsystems 5a and 5b based on an estimation result of the noise amount estimation circuit 9.

(Operation of Touch Panel System 1)

Figure 4:
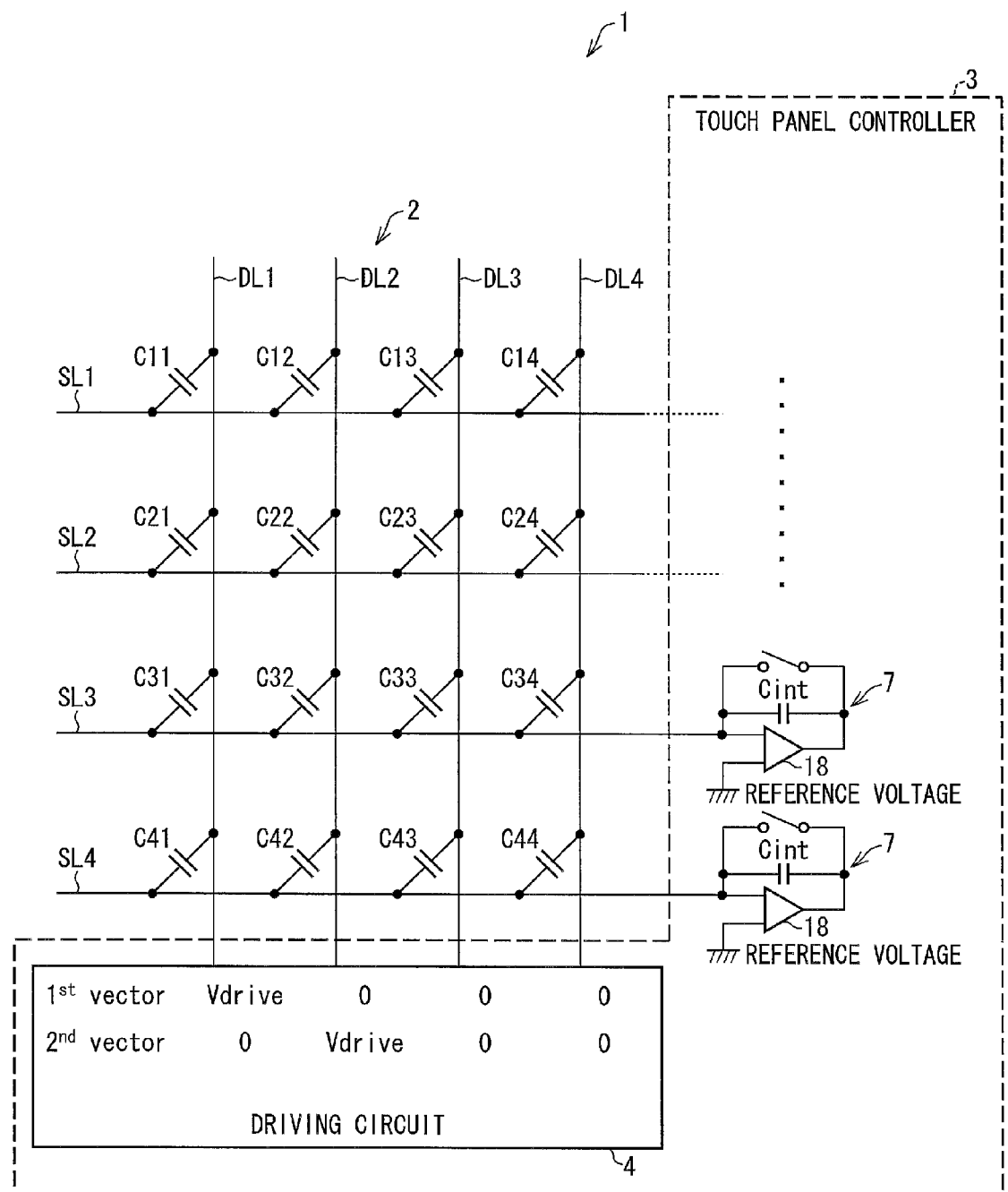
FIG. 4 is a circuit diagram illustrating a driving method of a touch panel system.

FIG. 4 is a circuit diagram illustrating a driving method of a touch panel system 1. FIG. 5 is a diagram for explaining numeral expressions illustrating a driving method of the touch panel system 1.

The driving circuit 4 drives the drive lines DL1 through DL4 based on a code sequence of four rows and four columns which is represented by Expression 3 in FIG. 5. The driving circuit 4 applies a voltage Vdrive in a case where an element of the code sequence equals to "1", whereas the drive section applies no voltage in a case where the element equals to "0".

Each of the amplifier circuits 7 receives and amplifies linear sums Y1, Y2, Y3, and Y4 of electrostatic capacitors, which are provided along a sense line, and are driven by the driving circuit 4.

For example, in the $1^{st}$ driving of four drivings based on the code sequence of four rows and four columns, the driving circuit 4 applies a voltage Vdrive to the drive line DL1, while applying no voltage to the drive lines DL2 through DL4. For example, from the amplifier circuit 7 connected to the sense line SL3, a measurement value Y1 (see Expression 1 in FIG. 5) of the electrostatic capacitor C31 is outputted as a result of the application of the voltage Vdrive.

In the second driving of the four drivings, the driving circuit 4 applies a voltage Vdrive to the drive line DL2, while applying no voltage to the drive lines DL1, DL3, and DL4. In this case, a measurement value Y2 (see Expression 2 in FIG. 5) of the electrostatic capacitor C32 is consequently outputted from the amplifier circuit 7 connected to the sense line SL3.

In the third driving of the four drivings, the driving circuit 4 applies a voltage Vdrive to the drive line DL3, while applying no voltage to the drive lines DL1, DL2, and DL4. In the fourth driving of the four drivings, the driving circuit 4 applies a voltage Vdrive to the drive line DL4, while applying no voltage to the drive lines DL1, DL2, and DL3.

The measurement values Y1, Y2, Y3, and Y4 are correlated with respective electrostatic capacitance values C1, C2, C3, and C4 (see Expressions 3 and 4 in FIG. 5). Note that, for simple description, a coefficient (−Vdrive/Cint) for each of the measurement values Y1 through Y4 is omitted from Expressions 3 and 4 in FIG. 5.

Figure 6:
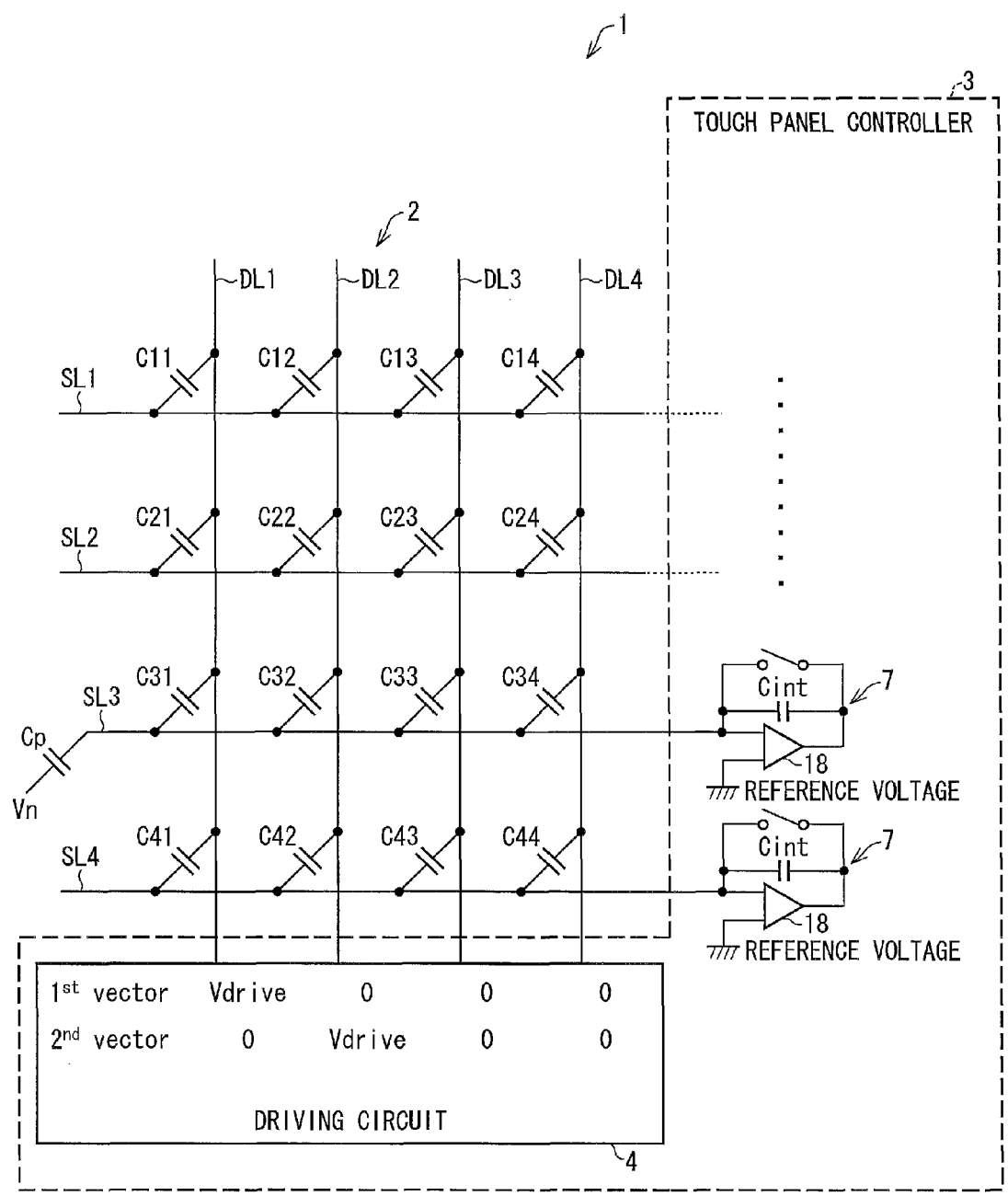
FIG. 6 is a circuit diagram illustrating a situation in which noise is applied to the touch panel system.

FIG. 6 is a circuit diagram illustrating a situation in which noise is applied to the touch panel system 1. For simple explanation, the description below takes the sense line SL3 as an example. When noise is applied to the linear sum signal which is outputted along the sense line SL3 via a parasitic capacitor Cp which is coupled with the sense line SL3, the linear sum signal is represented by the following expression:

$$(-C \times Vdrive/Cint) + (Cp \times Vn/Cint).$$

Therefore, noise represented by $Ey = Cp \times Vn/Cint$ is mixed in the linear sum signal.

Figure 7:
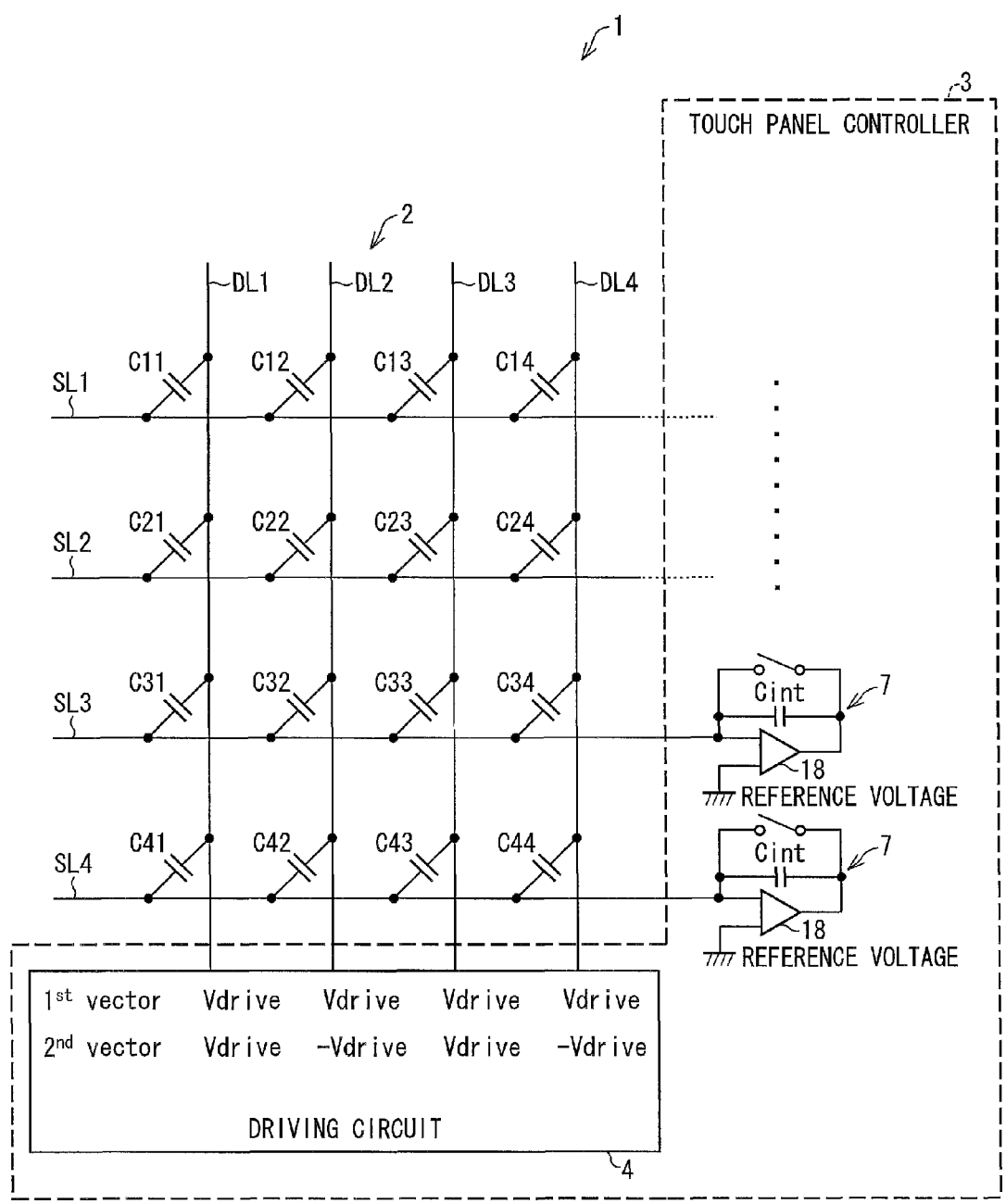
FIG. 7 is a circuit diagram for explaining a parallel driving method provided in the touch panel system.

FIG. 7 is a circuit diagram for explaining a parallel driving method provided in the touch panel system 1. FIG. 8 is a diagram for explaining numerical expressions each of which represents the parallel driving method provided in the touch panel system 1.

The driving circuit 4 drives the drive lines DL1 through DL4 on the basis of an orthogonal code sequence of four rows and four columns which is represented by Expression 5 in FIG. 8. Each element of the orthogonal code sequence equals to "1" or "−1". In a case where the element equals to "1", the driving section 54 applies a voltage Vdrive, whereas in a case where the element equals to "−1", the driving section 54 applies a voltage −Vdrive. Note here that the voltage Vdrive can be a power supply voltage or a voltage other than the power supply voltage.

Inner products of the measurement values Y1 through Y4 and the orthogonal code sequence are calculated out (see Expression 6 in FIG. 8). On the basis of the inner products, capacitance values of the respective electrostatic capacitors C1 through C4 can be estimated (see Expression 7).

Since noise is relatively large in a touch panel system, the above operation is repeated twice or more times, so that data of an average linear sum signal can be treated as a true value. When the timing of the operation which is performed twice or more times is changed, it is possible to realize the subsystems 5a and 5b (see FIG. 3) which have different input-output transfer characteristics.

FIG. 9 is a diagram for explaining numerical expressions each of which represents a method of performing parallel driving in the touch panel system 1 on a basis of an M-sequence code. It is possible to estimate capacitance values of the respective electrostatic capacitors even in an arrangement in which parallel driving of each of the electrostatic capacitors is performed on the basis of an M-sequence code. On the basis of inner products of the linear sum signals Y1 through Y7 which inner products are calculated out (see Expressions 8 through 11), capacitance values of the respective electrostatic capacitors C1 through C7 can be estimated. The "M sequence" is a type of a binary pseudo-random number sequence, and is composed of only two values, that is, 1 and −1 (or 1 and 0). The length of one (1) period of the M sequence is $2^n-1$. As an example of the M sequence which has a length of $2^3-1=7$, "1, −1, −1, 1, 1, 1, −1" can be taken.

(Configuration of Touch Panel System 1a)

Figure 10:
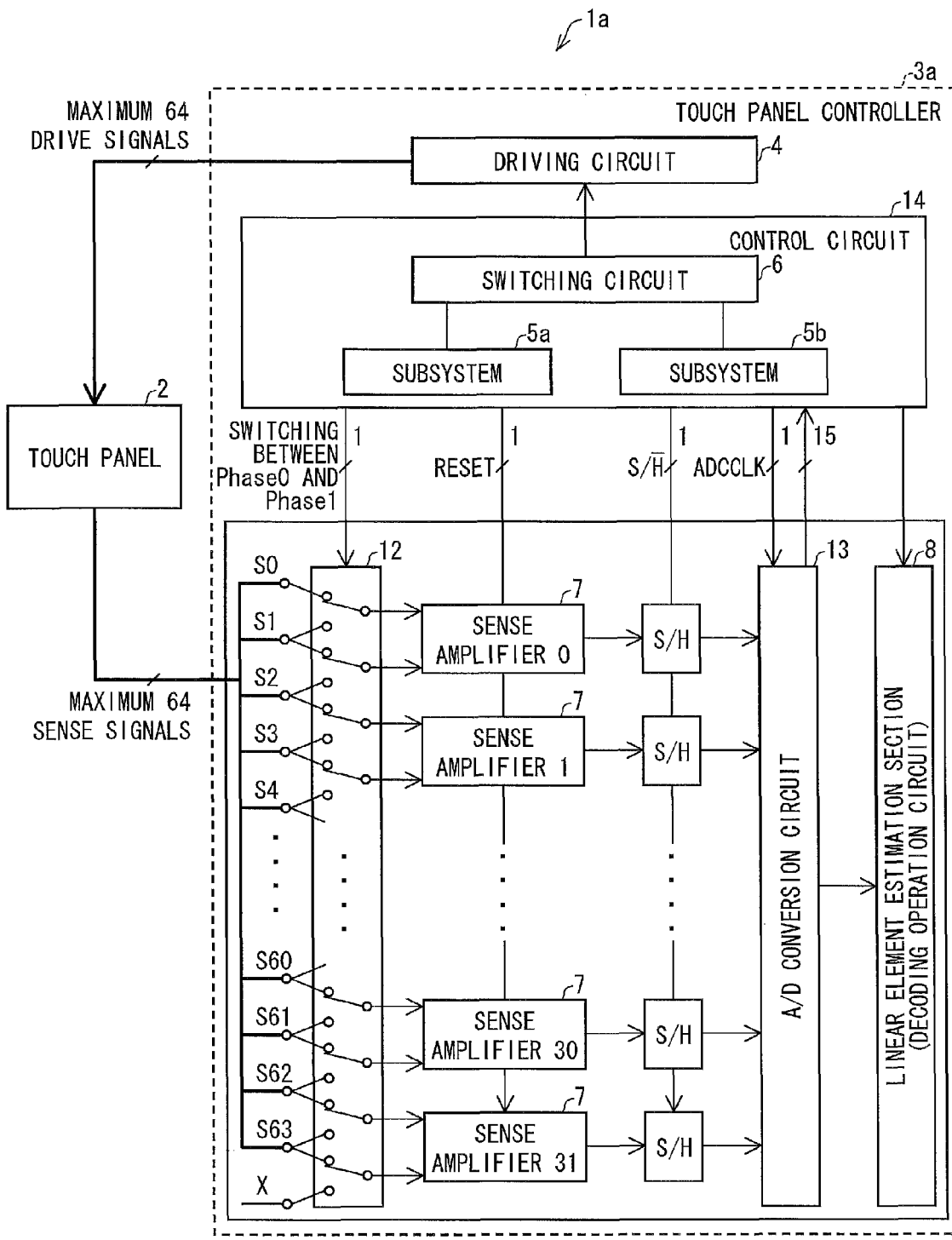
FIG. 10 is a circuit diagram illustrating a configuration of another touch panel system according to Embodiment 1.

FIG. 10 is a circuit diagram illustrating a configuration of another touch panel system 1a according to Embodiment 1. Identical reference numerals are given to components identical to those described with reference to FIG. 3. Therefore, the detailed description of such components is omitted below.

The touch panel system 1a includes a touch panel controller 3a. The touch panel controller 3a includes a switching circuit 12. The switching circuit 12 switches an input state of each of the amplifier circuits 7 between an even-numbered phase state (Phase0) in which inputs are applied to a $2n^{th}$ sense line and a $(2n+1)^{th}$ sense line and an odd-numbered phase state (Phase1) in which inputs are applied to a $(2n+1)^{th}$ sense line and a $(2n+2)^{th}$ sense line. Here, n is an integer in a range from zero to 31.

The control circuit 14 controls the amplifier circuit 7. For example, the control circuit 14 controls a signal which is to be fed to the switching circuit 12 which corresponds to an even-numbered phase driving and an odd-number phase driving which switch the input state of the amplifier circuit 7. Moreover, the control circuit 14 controls sampling frequencies of the A/D conversion circuit 13 and the respective numbers of multiple samplings of the A/D conversion circuit 13. Furthermore, the control circuit 14 controls an operation of the decoding operation circuit 8.

(a), (b), and (c) of FIG. 11 are each a diagram for explaining a unit of drivings performed on the electrostatic capacitors in the other touch panel system 1a.

(a) of FIG. 11 is a diagram for explaining driving performed on a frame-by-frame basis. The touch panel system 1a repeats (M+1) frame drivings Frame 0 through Frame M in this order. Each of the frame drivings Frame 0 through Frame M includes (N+1) vector drivings Vector 0 through Vector N. Each of the vector drivings Vector 0 through Vector N includes an even-numbered phase driving Phase0 and an odd-numbered phase driving Phase1.

In the vector driving Vector 0 included in each of the frame drivings Frame 0 through Frame M (see (a) of FIG. 11), the odd-numbered phase driving Phase0 (illustrated as "Phase0" in white pattern on a black ground in (a) of FIG. 11) corresponds to one of "a plurality of time-series signals which are sampled at a discrete time and are derived from a linear element" as recited in Claims.

(b) of FIG. 11 is a diagram for explaining driving performed on a vector-by-vector basis. First, drivings are successively performed based on only the vector driving Vector 0 which is included in each of the frame drivings Frame 1 through Frame M, in the following order: the vector driving Vector 0 of the frame driving Frame 0, the vector driving Vector 0 of the frame driving Frame 1, the vector driving Vector 0 of the frame driving Frame 2, . . . , and the vector driving Vector 0 of the frame driving Frame M.

Then, drivings are successively performed based on only the vector driving Vector 1 which is included in each of the frame drivings Frame 1 through Frame M, in the following order: the vector driving Vector 1 of the frame driving Frame 0, the vector driving Vector 1 of the frame driving Frame 1, the vector driving Vector 1 of the frame driving Frame 2, . . . , and the vector driving Vector 1 of the frame driving Frame M. Next, drivings are successively performed based on only the vector driving Vector 2 which is included in each of the frame drivings Frame 1 through Frame M, in the following order: the vector driving Vector 2 of the frame driving Frame 0, the vector driving Vector 2 of the frame driving Frame 1, the vector driving Vector 2 of the frame driving Frame 2, . . . , and the vector driving Vector 2 of the frame driving Frame M. Similar drivings are performed until the vector driving Vector N.

(c) of FIG. 11 is a diagram for explaining driving performed on a phase-by-phase basis. First, drivings are successively performed based on only the phase driving Phase0 of the vector driving Vector 0 which is included in each of the frame drivings Frame 1 through Frame M, in the following order: the phase driving Phase0 which is included in the vector driving Vector 0 of the frame driving Frame 0, the phase driving Phase0 which is included in the vector driving Vector 0 of the frame driving Frame 1, the phase driving Phase0 which is included in the vector driving Vector 0 of the frame driving Frame 2, . . . , and the phase driving Phase0 which is included in the vector driving Vector 0 of the frame driving Frame M.

Then, drivings are successively performed based on only the phase driving Phase1 of the vector driving Vector 0 which is included in each of the frame drivings Frame 1 through Frame M, in the following order: the phase driving Phase1 which is included in the vector driving Vector 0 of the frame driving Frame 0, the phase driving Phase1 which is included in the vector driving Vector 0 of the frame driving Frame 1, the phase driving Phase1 which is included in the vector driving Vector 0 of the frame driving Frame 2, . . . , and the phase driving Phase1 which is included in the vector driving Vector 0 of the frame driving Frame M.

Next, drivings are successively performed based on only the phase driving Phase0 of the vector driving Vector 1 which is included in each of the frame drivings Frame 1 through Frame M, in the following order: the phase driving Phase0 which is included in the vector driving Vector 1 of the frame driving Frame 0, the phase driving Phase0 which is included in the vector driving Vector 1 of the frame driving Frame 1, the phase driving Phase0 which is included in the vector driving Vector 1 of the frame driving Frame 2, . . . , and the phase driving Phase0 which is included in the vector driving Vector 1 of the frame driving Frame M. Similar drivings are performed until the vector driving Vector N.

(a), (b), and (c) of FIG. 12 are each a diagram for explaining a method of inversely driving each of the plurality of electrostatic capacitors in the touch panel system 1a.

(a) of FIG. 12 illustrates a method of performing inversion driving for the even-numbered driving while continuing the driving performed on a vector-by-vector basis (the even-numbered driving to be performed by inversion driving is indicated in a white pattern on a black ground). First, driving is performed based on the vector driving Vector 0 of the frame driving Frame 0. Then, inversion driving is performed based on the vector driving Vector 0 of the frame driving Frame 1. Next, driving is performed based on the vector driving Vector 0 of the frame driving Frame 2. Next, inversion driving is performed based on the vector driving Vector 0 of the frame driving Frame 3. The inversions each occur in groups of two phase drivings. A period of the same data is a period corresponding to two phase drivings. The polarities of even-numbered time-series data of the same data are inverted by the inversion driving.

(b) of FIG. 12 illustrates an example of the case where the driving of the phase driving Phase1 is performed by inversion driving (the driving to be performed by inversion driving is indicated in a white pattern on a black ground). First, driving is performed based on the phase Phase0 which is included in the vector driving Vector 0 of the frame driving Frame 0. Then, inversion driving is performed based on the phase Phase1 which is included in this vector driving Vector 0. Next, driving is performed based on the phase Phase0 which is included in the vector driving Vector 0 of the frame driving Frame 1. Then, inversion driving is performed based on the phase Phase1 which is included in this vector driving Vector 0. The inversions each occur in one phase driving. A period of the same data is a period corresponding to two phase drivings. The polarities of the same data are identical.

(c) of FIG. 12 is an example of the case where the even-numbered driving is performed by inversion driving while continuing the phase driving (the even-numbered driving to be performed by inversion driving is indicated in a white pattern on a black ground). First, driving is performed based on the phase driving Phase0 which is included in the vector driving Vector 0 of the frame driving Frame 0. Then, inversion driving is performed based on the phase driving Phase0 which is included in the vector driving Vector 0 of the frame driving Frame 1.

Next, driving is performed based on the phase driving Phase0 which is included in the vector driving Vector 0 of the frame driving Frame 2. Subsequently, inversion driving is performed based on the phase driving Phase0 which is included in the vector driving Vector 0 of the frame driving Frame 3.

The inversions each occur in one phase driving. A period of the same data is a period corresponding to one phase driving. The polarities of the same data are inverted at an even-numbered time.

FIG. 13 is a waveform chart of a driving signal and other signals when driving is performed based on the $1^{st}$ vector, and then driving is performed based on the 2nd vector by the tough panel system 1a. FIG. 13 illustrates a waveform chart which corresponds to the phase driving Phase0 of the vector driving Vector0 and the phase driving Phase0 of the vector driving Vector 1 (see (a) of FIG. 11). When a signal Phase0 is on, driving based on an even-numbered phase driving Phase0 is performed. Meanwhile, when the signal Phase0 is off, driving based on an odd-numbered phase driving Phase1 is performed. When a reset signal reset_cds is on, the amplifier circuit 7 is reset. When a driving signal Drive is on, the electrostatic capacitors C11 through C44 are driven. When a clock signal clk_sh is on, the linear sum signals are read out along their respective sense lines. Each of the linear sum signals based on the even-numbered phase driving Phase0 is obtained at 1-frame intervals (period T1).

(a) of FIG. 14 is a waveform chart of a driving signal and other signals when the driving based on the $1^{st}$ vector is successively performed by the touch panel system 1a. (b) of FIG. 14 is a waveform chart of a driving signal and other signals when driving based on Phase0 of the $1^{st}$ vector is successively performed.

In a case where the vector driving Vector 0 ($1^{st}$ vector) is successively performed (see (b) of FIG. 11), each of the linear sum signals based on the vector driving Vector 0 is obtained in two phase periods (period T2) (see (a) of FIG. 14).

In a case where the phase driving Phase0 which is included in the vector driving Vector 0 ($1^{st}$ vector) is successively performed (see (c) of FIG. 11), each of the plurality of linear sum signals based on the phase driving Phase0 is obtained in one (1) phase intervals (period T3) (see (b) of FIG. 14).

(a) of FIG. 15 is a waveform chart of a driving signal and other signals when driving based on the $1^{st}$ vector is successively performed by the touch panel system 1a. (b) of FIG. 15 is a waveform chart of a driving signal and other signals in case where the driving based on the $1^{st}$ vector at an even-numbered time is inverted.

When the reset signal reset_cds rises, the driving signal Drive falls. Then, after the reset signal reset_cds falls at time t3, the driving signal Drive rises (see (a) of FIG. 15).

The inversion of the driving is performed when the driving signal Drive falls from high to low (see (b) of FIG. 15). Therefore, the driving signal Drive does not have to be fallen when the reset signal rises (see (a) of FIG. 15). The fall of the reset signal before the inversion driving can occur at time t2 which is earlier by ΔT than the falling time t3 of the reset signal (see (a) of FIG. 15). This allows the reset time during which the reset signal reset_cds is on to be reduced by ΔT. Consequently, although each of the linear sum signals based on the vector driving Vector 0 is obtained in two phase intervals (period T2 from time t1 to time t5) (see (a) of FIG. 15), each of the linear sum signals can be obtained in (two phases −ΔT) intervals (period T5 from time t1 to time t4) (see (b) of FIG. 15).

(a) of FIG. 16 is a waveform chart of a driving signal and other signals when driving based on Phase0 of the $1^{st}$ vector is successively performed. (b) of FIG. 16 is a waveform chart of a driving signal, for example, when driving based on Phase0 of the $1^{st}$ vector at an even-numbered time is inverted.

According to (b) of FIG. 16, the fall of the reset signal before the inversion driving is allowed to occur at time t7 which is earlier by ΔT than falling time t8 of the reset signal (see (a) of FIG. 16). This allows the reset time during which the reset signal reset_cds is on to be reduced by ΔT. Consequently, a subsequent fall of the reset signal is allowed to occur at t11 which is earlier by Δ2T in total than falling time t12 of the reset signal (see (a) of FIG. 16).

Thus, although each of the linear sum signals based on the phase driving Phase0 of the vector driving Vector 0 is obtained in one phase intervals (period T3 from time t6 to time t10) in the example illustrated in (a) of FIG. 16, each of the linear sum signals can be obtained in (one phase−ΔT) intervals (period T7 from time t6 to time t9) (see (b) of FIG. 16).

(a) of FIG. 17 is a waveform chart of a driving signal and other signals when driving based on Phase0 of the $1^{st}$ vector is successively performed. (b) of FIG. 17 is a waveform chart of a driving signal and other signals when driving based on Phase1 of the $1^{st}$ vector is inverted.

When the odd-numbered phase driving Phase1 is inverted while the vector drivings Vector 0 each of which includes an even-numbered phase driving Phase0 and an odd-number phase driving Phase1 (see (b) of FIG. 11) is successively performed, the fall of the reset signal before the inversion driving is allowed to occur at time t16 which is earlier by ΔT than falling time t17 of the reset signal (see (a) of FIG. 17). This allows the reset time during which the reset signal reset_cds is on to be reduced by ΔT. Consequently, a subsequent fall of the reset signal is allowed to occur at time t20 which is earlier by Δ2T in total than falling time t21 of the reset signal (see (a) of FIG. 17).

Thus, although each of the linear sum signals based on the phase driving Phase0 of the vector driving Vector 0 is obtained in one phase intervals (period T3 from time t15 to time t19) in the example illustrated in (a) of FIG. 17, each of the linear sum signals is obtained in (two phases−2ΔT) intervals (period from time t15 to time t22) (see (b) of FIG. 17).

FIG. 18 is a graph illustrating a frequency characteristic of CDS (correlated double sampling) in the touch panel system 1a. Each of the linear sum signals of electrostatic capacitors which are read out along a corresponding one of the sense lines is sampled through CDS which has a frequency characteristic shown in FIG. 18.

FIG. 19 is a graph illustrating a frequency characteristic of an octuple sampling by the touch panel system 1a. The horizontal axis indicates a frequency, and the vertical axis indicates a signal change amount. The length of the time of one (1) phase is 2.5 μsec, and the length of the reduced time of a reset signal is ΔT=0.5ρsec. This graph indicates that the touch panel system 1a is vulnerable to noise in a frequency band in which the signal change amount is about 0 dB. Since there is no frequency band, under any conditions, in which the signal change amount is 0 dB, it can be expected that noise can be reduced by changing a sampling operation if there is one noise frequency (see FIG. 19). Note that under such a sampling condition, an operating speed (report rate) does not decrease.

Moreover, in a case where the CDS frequency is set to (noise frequency×(1/integer), noise should be eliminated through the CDS processing. Since this basically decreases the CDS frequency, an operating speed (report rate) decreases.

FIG. 20 is a graph illustrating a frequency characteristic of another octuple sampling by the touch panel system 1a. The length of the time of one (1) phase is 2.5 μsec, and the length of the reduced time of a reset signal is ΔT=0.0 ρsec. FIG. 20 illustrates a frequency characteristic obtained in a case where the vector driving is successively performed, a frequency characteristic obtained in a case where the phase driving is successively performed, a frequency characteristic obtained in a case where the vector driving is successively performed and inversion driving is performed at an even-numbered time, and a frequency characteristic obtained in a case where the phase driving is successively performed and inversion driving is performed at an even-numbered time.

FIG. 21 is a graph illustrating a frequency characteristic of a still another octuple sampling by the touch panel system 1a. The length of the time of one (1) phase is 2.5 μsec, and the length of the reduced time of a reset signal is ΔT=0.0 μsec. The CDS frequency is 500 kHz (=2.0 μsec). FIG. 21 illustrates a frequency characteristic obtained in a case where the vector driving is successively performed, a frequency characteristic obtained in a case where the phase driving is successively performed, a frequency characteristic obtained in a case where the vector driving is successively performed and inversion driving is performed at an even-numbered time, and a frequency characteristic obtained in a case where the phase driving is successively performed and inversion driving is performed at an even-numbered time. Thanks to the effect of CDS, the signal change amounts in 0 kHz, 500 kHz, and 1000 kHz are reduced as compared with the signal change amount as illustrated in an example of FIG. 20.

FIG. 22 is a graph illustrating a frequency characteristic of quadruple sampling by the touch panel system 1a. The length of the time of 1 phase is 2.5 μsec, and the length of the reduced time of a reset signal is ΔT=0.5 μsec. The CDS frequency is 500 kHz (=2.0 μsec). FIG. 22 illustrates a frequency characteristic obtained in a case where the vector driving is successively performed, a frequency characteristic obtained in a case where the phase driving is successively performed, a frequency characteristic obtained in a case where the vector driving is successively performed and inversion driving is performed at an even-numbered time, and a frequency characteristic obtained in a case where the phase driving is successively performed and inversion driving is performed at an even-numbered time.

FIG. 23 is a graph illustrating a frequency characteristic of a still another octuple sampling by the touch panel system 1a. FIG. 23 is a graph which plots, with respect to the individual frequencies, minimums of signal change amounts of a frequency characteristic obtained in a case where the vector driving is successively performed, a frequency characteristic obtained in a case where the phase driving is successively performed, a frequency characteristic obtained in a case where the vector driving is successively performed and inversion driving is performed at an even-numbered time, and a frequency characteristic obtained in a case where the phase driving is successively performed and inversion driving is performed at an even-numbered time. The length of the time of one (1) phase is 2.5 μsec, and the length of the reduced time of a reset signal is ΔT=0.0 μsec. The CDS frequency is 500 kHz (=2.0 μsec).

FIG. 24 is a graph illustrating a frequency characteristic of another quadruple sampling by the touch panel system 1a. FIG. 24 is a graph in which plots regarding the quadruple sampling are made as in the example of the octuplet sampling in FIG. 23.

(a), and (b) of FIG. 25 are each a diagram for comparison between the driving methods of the touch panel system 1a. In an operating mode in which the driving is performed on a frame-by-frame basis (see (a) of FIG. 11) ((0) when phase/vector driving is not successively performed), a time interval for obtaining linear sum signal data for average processing is one (1) frame, and all of the polarities of linear sum time-series signals to be obtained are identical to each other. The frequency which has an unfavorable attenuation characteristic is 1/frame*N.

In an operating mode in which the vector driving is successively performed (see (b) of FIG. 11) ((1) when vector driving is successively performed), a time interval for obtaining linear sum signal data is two frames, and all of the polarities of linear sum time-series signals to be obtained are identical to each other. The frequency which has an unfavorable attenuation characteristic is ½ phases*N.

In an operating mode in which the phase driving is successively performed (see (c) of FIG. 11) ((2) when phase driving is also successively performed), a time interval for obtaining linear sum signal data is one (1) frame, and all of the polarities of linear sum time-series signals to be obtained are identical to each other. The frequency which has an unfavorable attenuation characteristic is 1/phase*N.

In an operating mode in which the vector driving is successively performed and the even-numbered driving is performed by inversion driving (see (a) of FIG. 12, and (a) of FIG. 15) ((3) while vector driving is successively performed, inversion driving is performed for the even-numbered driving), a time interval for obtaining linear sum signal data is (2 phases−ΔT), and the polarity of linear sum time-series signals to be obtained are inverted at an even-numbered time. The frequency which has an unfavorable attenuation characteristic is 1/(2 phases−ΔT)*(N+0.5).

In an operating mode in which the phase driving is successively performed and the even-numbered driving is performed by inversion driving (see (c) of FIG. 12, and (b) of FIG. 16) ((4) while phase driving is successively performed, inversion driving is performed for the even-numbered driving), a time interval for obtaining linear sum signal data is (1 phase−ΔT), and the polarity of linear sum time-series signals to be obtained is inverted at an even-numbered time. The frequency which has an unfavorable attenuation characteristic is 1/(phase−ΔT)*(N+0.5).

In an operating mode in which the odd-numbered phase driving is performed by inversion driving (see (b) of FIG. 17)

((5) when inversion driving is performed for Phase1), a time interval for obtaining linear sum signal data is (2 phases–2ΔT), and all of the polarities of linear sum time-series signals to be obtained are positive polarities in the even-numbered phase driving Phase0, and are negative polarities in the odd-numbered phase driving Phase1. The frequency which has an unfavorable attenuation characteristic is 1/(2 phases–2ΔT)*N.

In an operating mode in which the driving is successively performed on a frame-by-frame basis and the even-numbered driving is performed by inversion driving ((6) when phase/vector driving is not successively performed and inversion driving is performed for the even-numbered driving), a time interval for obtaining linear sum signal data is one (1) frame, and the polarities of linear sum time-series signals to be obtained are inverted at an even-numbered time. The frequency which has an unfavorable attenuation characteristic is 1/frame*(N+0.5).

(Operation of Noise Amount Estimation Circuit 9)

The noise amount estimation circuit 9 estimates a noise amount using respective values of a linear element CX through a plurality of outputs of the linear element estimation section (a value of the linear element CX or a plurality of estimation results of the input of the linear element CX through addition- and subtraction-based signal processing). The switching circuit 6 switches between the subsystems 5a and 5b based on each of the plurality of estimation results of the noise amount estimation circuit 9. Normally, a plurality of the estimates are the same with each other. If the plurality of estimates are not the same with each other, the noise amount estimation circuit 9 estimates an increase in an effect of the noise amount mixed in the plurality of estimation results.

(Configuration of Subsystem)

A plurality of subsystems provided in the control circuit 14 can be configured in a variety of types based on the above description in order to reduce external noise.

For example, a subsystem which performs, on a frame-by-frame basis, averaging on a plurality of linear sum signals based on the same vector driving and the same phase driving, a subsystem which performs, on a vector-by-vector basis, averaging, and a subsystem which performs, on a phase-by-phase basis, averaging may be provided so that any of these subsystems is selected to reduce external noise in accordance with a frequency characteristic between a normalization frequency and an amplitude change rate.

A subsystem may be provided having a function of inverting a code of a driving signal when the averaging is performed on a vector-by-vector basis and on a phase-by-phase basis. In this case, a subsystem which sets a period of driving and inversion to two phases and a subsystem which sets a period of driving and inversion to one phase may be provided so that any of these subsystems is selected to reduce external noise in accordance with the frequency characteristic.

Moreover, in a case where a subsystem includes the driving and inversion function of a driving signal, the subsystem may reduce the reset time of a reset signal for resetting an amplifier circuit.

Embodiment 2

The following describes another embodiment of the present invention with reference to FIG. 26. For convenience of description, identical reference numerals are given to components identical to those described in Embodiment 1. A description of such members is omitted below.

FIG. 26 is a circuit diagram illustrating a configuration of a touch panel system according to Embodiment 2. The touch panel system according to Embodiment 2 includes a touch panel controller 3b. The touch panel controller 3b is provided with amplifier circuits 7a. The amplifier circuits 7a include their respective differential amplifiers 18a. Each of the differential amplifiers 18a receives and amplifies linear sum signals which are read out from corresponding sense lines adjacent to each other.

When the amplifier circuit is configured by the differential amplifier, the touch panel controller can further increase noise resistance.

Embodiment 3

FIG. 27 is a block diagram illustrating a configuration of a mobile phone 90 (electronic apparatus) according to Embodiment 3. The mobile phone 90 includes a CPU 96, a RAM 97, a ROM 98, a camera 95, a microphone 94, a speaker 93, an operation key 91, a display section 92 which includes a display panel 92b and a display controlling circuit 92a, and the touch panel system 1. These components are connected to each other via a data bus.

The CPU 96 controls an operation of the mobile phone 90. The CPU 96 executes a program stored in, for example, the ROM 98. A user of the mobile phone 90 enters an instruction via the operation key 91. The RAM 97 is a volatile memory which stores therein (i) data generated by executing of a program by the CPU 96 or (ii) data entered via the operation key 91. The ROM 98 is an involatile memory which stores data therein.

The ROM 98 is a ROM, such as an EPROM (Erasable Programmable Read-Only Memory) or a flash memory, into/from which data can be written or deleted. Note that the mobile phone 90 can further be provided with an interface (IF) to which other electronic apparatus is to be connected via a wire, though the interface is not illustrated in FIG. 27.

The camera 95 shoots an image of a subject in accordance with a user's operation of the operation key 91. Note that data of the image thus shot is stored in the RAM 97 or an external memory (e.g., a memory card). The microphone 94 receives audio from a user. The mobile phone 90 digitizes the audio (analog data), and transmits the audio thus digitized to a target (such as other mobile phone). The speaker 93 produces sounds based on data such as music data stored in the RAM 97.

The touch panel system 1 includes a touch panel 2 and a touch panel controller 3. The CPU 96 controls an operation of the touch panel system 1. The CPU 96 executes a program stored in, for example, the ROM 98. The RAM 97 is the volatile memory which stores therein data generated by executing of a program by the CPU 96. The ROM 97 is the involatile memory which stores data therein.

The display controlling circuit 92a controls the display panel 92b to display an image stored in the ROM 98 or in the RAM 97. The display panel 92b (i) is provided so as to overlap the touch panel 2 or (ii) has the touch panel 2 built-in.

CONCLUSION

A signal processing system according to an aspect of the present invention is a signal processing system which performs addition- and subtraction-based signal processing on a plurality of time-series signals which are sampled at a discrete time and are derived from a linear element, to estimate a value or an input of the linear element, the signal processing system including: first and second subsystems which have different input-output transfer characteristics; and a switching circuit which switches between the first subsystem and the second subsystem (the subsystems 5a and 5b) and then connects one of the first and second subsystems to the linear element, to reduce noise present in a result of estimation of the value or input of the linear element, which estimation is performed by the addition- and subtraction-based signal processing, on a basis of a frequency of noise mixed in each of the time-series signals, an amount of that noise, and the input-output transfer characteristics.

According to the configuration, the first subsystem and the second subsystem (the subsystems 5a and 5b) are switched, on the basis of a frequency of noise mixed in each of the time-series signals, an amount of that noise, and the input-output transfer characteristics, to reduce noise present in a result of estimation of the value or input of the linear element, which estimation is performed by the addition, and subtraction-based signal processing. Therefore, it is possible to reduce noise present in a result of estimation of the value or input of the linear element corresponding to the plurality of time-series signals which are sampled at a discrete time and are derived from the linear element.

Furthermore, a signal processing system according to an aspect of the present invention may be arranged such that there is a difference between (i) respective numbers of multiple samplings of the time-series signals derived from the linear element based on the first subsystem (the subsystem 5a) and (ii) respective numbers of multiple samplings of the time-series signals derived from the linear element based on the second subsystem (the subsystem 5b).

According to the configuration, by switching between the first subsystem and the second subsystem which are different in multiplicity of multiple sampling, it is possible to reduce noise present in a result of estimation of the value or input of the linear element corresponding to a plurality of time-series signals which are sampled at a discrete time and are derived from the linear element.

A signal processing system according to an aspect of the present invention may be arranged such that there is a difference between (i) a sampling frequency with respect to the time-series signals derived from the linear element based on the first subsystem (the subsystem 5a) and (ii) a sampling frequency with respect to the time-series signals derived from the linear element based on the second subsystem (the subsystem 5b).

According to the configuration, by switching between the first subsystem and the second subsystem which are different in sampling frequency of the time-series signals, it is possible to reduce noise present in a result of estimation of the value or input of the linear element corresponding to the time-series signals which are sampled at a discrete time and are derived from the linear element.

A signal processing system according to an aspect of the present invention may be arranged such that polarities of respective codes of the plurality of time-series signals based on the first subsystem (the subsystem 5a) are inverted along a time series, and polarities of respective codes of the plurality of time-series signals based on the second subsystem (the subsystem 5b) are identical along a time series.

According to the configuration, since the inversion driving makes the input-output transfer characteristics different from those in the case of constant driving, it is possible to reduce noise present in a result of estimation of the value or input of the linear element corresponding to a plurality of time-series signals which are sampled at a discrete time and are derived from the linear element.

A signal processing system according to an aspect of the present invention may further include a noise amount estimation section (noise amount estimation circuit 9) which estimates the amount of noise from an estimate of the linear element or from an estimate of the input of the linear element, wherein the estimates are obtained by the addition- and subtraction-based signal processing on the time-series signals, and the switching section (the switching circuit 6) may switch between the first subsystem and the second subsystem (the subsystems 5a and 5b) on a basis of a result of the estimation performed by the noise amount estimation section (the noise amount estimation circuit 9).

According to the configuration, it is possible to switch between the first subsystem and the second subsystem to reduce the amount of noise present in the estimation result when the noise amount increases.

A signal processing system according to an aspect of the present invention may further include an analog-to-digital conversion circuit (an A/D conversion circuit 13) which performs analog-to-digital conversion on the plurality of time-series signals derived from the linear element and then generates a plurality of time-series signals which are sampled at the discrete time.

According to the configuration, it is possible to estimate a value of the linear element by digital processing.

A touch panel controller according to an aspect of the present invention is a touch panel controller which controls a touch panel including a plurality of electrostatic capacitors provided at respective intersections where a plurality of drive lines and a plurality of sense lines intersect with each other, the touch panel controller including: a driving circuit which drives the electrostatic capacitors along the drive lines; an amplifier circuit which (i) reads, along the sense lines, a plurality of linear sum signals based on respective ones of the electrostatic capacitors which are driven by the driving circuit and (ii) then amplifies the linear sum signals thus read; an analog-to-digital conversion circuit which performs analog-to-digital conversion on outputs of the amplifier circuit; a decoding operation circuit which estimates respective capacitance values of the electrostatic capacitors on a basis of respective ones of the outputs having been fed from the amplifier circuit and then subjected to the analog-to-digital conversion; first and second subsystems which have different input-output transfer characteristics; and a switching circuit which switches between the first subsystem and the second subsystem and then connects one of the first and second subsystems to the driving circuit, to reduce noise present in a result of estimation of respective values of the electrostatic capacitors, which estimation is performed by the addition- and subtraction-based signal processing performed by the decoding operation circuit, on a basis of a frequency of noise mixed in each of the linear sum signals, an amount of that noise, and the input-output transfer characteristics.

According to the configuration, switching between the first subsystem and the second subsystem is performed on a basis of a frequency of noise mixed in each of each of the linear sum signals, the amount of that noise, and the input-output transfer characteristics to reduce noise present in a result of estimation of respective capacitance values of the electrostatic capacitors by the decoding operation circuit. Therefore, it is possible to reduce noise present in a result of estimation of the value or input of the linear element corresponding to the plurality of linear sum signals based on the electrostatic capacitors which are driven by the driving section.

A touch panel controller according to an aspect of the present invention may be arranged such that the first subsystem (the subsystem 5a) performs first through $(M+1)^{th}$ frame drivings of performing first through $(N+1)^{th}$ vector drivings in this order, the first through $(N+1)^{th}$ vector drivings each including an even-numbered phase driving and an odd-numbered phase driving, and the second subsystem successively performs respective $k^{th}$ vector drivings ($1 \leq k \leq N+1$) of the first through $(M+1)^{th}$ frame drivings.

According to the configuration, it is possible to select one of the frame driving and the vector driving in accordance with (i) the amount of noise and (ii) a frequency characteristic between the sampling frequency and the amplitude change amount of each of the plurality of linear sum signals.

A touch panel controller according to an aspect of the present invention may be arranged such that the first subsystem (the subsystem 5a) performs first through $(M+1)^{th}$ frame drivings of performing first through $(N+1)^{th}$ vector drivings in this order, the first through $(N+1)^{th}$ vector drivings each including an even-numbered phase driving and an odd-numbered phase driving, and the second subsystem (the subsystem 5b) successively performs even-numbered phase drivings of respective $k^{th}$ vector drivings ($1 \leq k \leq N+1$) of the first through $(M+1)^{th}$ frame drivings, and successively performs odd-numbered phase drivings of the respective $k^{th}$ vector drivings.

According to the configuration, it is possible to select one of the frame driving and the phase driving in accordance with (i) the amount of noise and (ii) a frequency characteristic between the sampling frequency and the amplitude change amount of each of the plurality of linear sum signals.

A touch panel controller according to an aspect of the present invention be arranged such that the driving circuit further includes a third subsystem (the subsystem 5b) having an input-output transfer characteristic different from the input-output transfer characteristics of the first and second subsystems (the subsystems 5a and 5b), the first subsystem (the subsystem 5a) performs first through $(M+1)^{th}$ frame drivings of performing first through $(N+1)^{th}$ vector drivings in this order, the first through $(N+1)^{th}$ vector drivings each including an even-numbered phase driving and an odd-numbered phase driving, the second subsystem (the subsystem 5b) successively performs respective $k^{th}$ vector drivings ($1 \leq k \leq N+1$) of the first through $(M+1)^{th}$ frame drivings, and the third subsystem successively performs even-numbered phase drivings of respective $k^{th}$ vector drivings ($1 \leq k \leq N+1$) of the first through $(M+1)^{th}$ frame drivings, and successively performs odd-numbered phase drivings of the respective $k^{th}$ vector drivings.

According to the configuration, it is possible to select any one of the phase driving, the vector driving, and the phase driving, in accordance with (i) the amount of noise, and (ii) a frequency characteristic between the sampling frequency and the amplitude change amount of each of the plurality of linear sum signals.

A touch panel controller according to an aspect of the present invention may be arranged such that the first subsystem (the subsystem 5a) performs first through $(M+1)^{th}$ frame drivings of performing first through $(N+1)^{th}$ vector drivings in this order, the first through $(N+1)^{th}$ vector drivings each including an even-numbered phase driving and an odd-numbered phase driving, so that polarities of respective codes of the plurality of linear sum signals are inverted along a time series in respective ones of the first through $(M+1)^{th}$ frame drivings, and the second subsystem (the subsystem 5b) successively performs respective $k^{th}$ vector drivings ($1 \leq k \leq N+1$) of the first through $(M+1)^{th}$ frame drivings so that polarities of respective codes of the plurality of linear sum signals are inverted along a time series in respective ones of the first through $(N+1)^{th}$ vector drivings.

According to the configuration, it is possible to make a selection between inversion driving performed every frame driving and inversion driving performed every vector driving, in accordance with (i) the amount of noise and (ii) a frequency characteristic between the sampling frequency and the amplitude change amount of each of the plurality of linear sum signals.

A touch panel controller according to an aspect of the present invention may be arranged such that the first subsystem (the subsystem 5a) performs first through $(M+1)^{th}$ frame drivings of performing first through $(N+1)^{th}$ vector drivings in this order, each of the first through $(N+1)^{th}$ vector drivings including an even-numbered phase driving and an odd-numbered phase driving, so that polarities of respective codes of the plurality of linear sum signals are inverted along a time series in respective ones of the first through $(M+1)^{th}$ frame drivings, and the second subsystem (the subsystem 5b) successively performs even-numbered phase drivings of respective $k^{th}$ vector drivings ($1 \leq k \leq N+1$) of the first through $(M+1)^{th}$ frame drivings so that polarities of respective codes of the plurality of linear sum signals are inverted along a time series in respective ones of the even-numbered phase drivings, and may successively perform odd-numbered drivings of the respective $k^{th}$ vector drivings so that polarities of respective codes of the plurality of linear sum signals are inverted along a time series in respective ones of the odd-numbered phase drivings.

According to the configuration, it is possible to make a selection between inversion driving performed every frame driving and inversion driving performed every phase driving, in accordance with (i) the noise amount and (ii) a frequency characteristic between the sampling frequency and the amplitude change amount of each of the plurality of linear sum signals.

A touch panel controller according to an aspect of the present invention may be arranged such that the driving circuit further includes a third subsystem having an input-output transfer characteristic different from the input-output transfer characteristics of the first and second subsystems (the subsystems 5a and 5b), the first subsystem (the subsystem 5a) may perform first through $(M+1)^{th}$ frame drivings of performing first through $(N+1)^{th}$ vector drivings in this order, the first through $(N+1)^{th}$ vector drivings each including an even-numbered phase driving and an odd-numbered phase driving, so that polarities of respective codes of the plurality of linear sum signals are inverted along a time series in respective ones of the first through $(M+1)^{th}$ frame drivings, the second subsystem (the subsystem 5b) successively performs respective $k^{th}$ vector drivings ($1 \leq k \leq N+1$) of the first through $(M+1)^{th}$ frame drivings so that polarities of respective codes of the plurality of linear sum signals are inverted along a time series in respective ones of the first through $(N+1)^{th}$ vector drivings, and the third subsystem successively performs even-numbered phase drivings of respective $k^{th}$ vector drivings ($1 \leq k \leq N+1$) of the first through $(M+1)^{th}$ frame drivings so that polarities of respective codes of the plurality of linear sum signals are inverted along a time series in respective ones of the even-numbered phase drivings, and successively performs odd-numbered drivings of the respective $k^{th}$ vector drivings so that polarities of respective codes of the plurality of linear sum signals are inverted along a time series in respective ones of the odd-numbered phase drivings.

According to the configuration, it is possible to select any one of the frame driving, the vector driving, and the phase driving, in accordance with (i) the amount of noise and (ii) a frequency characteristic between the sampling frequency and the amplitude change amount of each of the plurality of linear sum signals.

A touch panel controller according to an aspect of the present invention may be arranged such that the first subsystem (the subsystem 5a) reduces a reset time of a reset signal for resetting the amplifier circuit (i) in a case where the plurality of electrostatic capacitors are driven so that polarities of respective codes of the plurality of linear sum signals are inverted along a time series, as compared with (ii) in a case where the plurality of electrostatic capacitors are driven so that polarities of respective codes of the plurality of linear sum signals are identical along a time series.

According to the configuration, the reset time for resetting the amplifier circuit is reduced. This makes it possible to change the sampling frequency.

A touch panel controller according to an aspect of the present invention may be arranged such that the amplifier circuit includes a differential amplifier which performs differential amplification on the linear sum signals outputted along corresponding respective adjacent sense lines.

According to the configuration, the touch panel controller can further increase noise resistance.

A touch panel system according to an aspect of the present invention is a touch panel system, including: a touch panel which includes a plurality of electrostatic capacitors provided at respective intersections where a plurality of drive lines and a plurality of sense lines intersect with each other; and a touch panel controller which controls the touch panel, the touch panel controller including: a driving circuit which drives the electrostatic capacitors along the drive lines; an amplifier circuit which (i) reads, along the sense lines, a plurality of linear sum signals based on respective ones of the electrostatic capacitors which are driven by the driving circuit and (ii) then amplifies the linear sum signals thus read; an analog-to-digital conversion circuit (A/D conversion circuit 13) which performs analog-to-digital conversion on outputs of the amplifier circuit; a decoding operation circuit which estimates respective capacitance values of the electrostatic capacitors on a basis of respective ones of the outputs having been fed from the amplifier circuit and then subjected to the analog-to-digital conversion; first and second subsystems which have different input-output transfer characteristics; and a switching circuit which switches between the first subsystem and the second subsystem and then connects one of the first and second subsystems (the subsystems 5a and 5b) to the driving circuit, to reduce noise present in a result of estimation of respective values of the electrostatic capacitors, which estimation is performed by the addition- and subtraction-based signal processing performed by the decoding operation circuit, on a basis of a frequency of noise mixed in each of the linear sum signals, an amount of that noise, and the input-output transfer characteristics.

An electronic apparatus according to an aspect of the present invention includes: a touch panel system according to an aspect of the present invention; and a display section (the display section 92) which corresponds to the touch panel system.

The present invention is not limited to the description of the embodiments above, and can therefore be modified by a skilled person in the art within the scope of the claims. Namely, an embodiment derived from a proper combination of technical means disclosed in different embodiments is encompassed in the technical scope of the present invention.

INDUSTRIAL APPLICABILITY

The present invention is applicable to (i) a signal processing system which performs addition- and subtraction-based signal processing on a plurality of time-series signals which are sampled at a discrete time and are derived from a linear element in order to estimate a value of the linear element, (ii) a touch panel controller which controls a touch panel having a plurality of electrostatic capacitors provided at respective intersections where a plurality of drive lines and a plurality of sense lines intersect with each other, and (iii) a touch panel system using the touch panel controller, and (iv) an electronic apparatus using the touch panel controller.

REFERENCE SIGNS LIST

1: touch panel system
2: touch panel
3: touch panel controller
4: driving circuit
5a, 5b: subsystems (first subsystem, second subsystem)
6: switching circuit
8: decoding operation circuit
9: noise amount estimation circuit
10: signal processing system
11: linear element estimation section
12: switching circuit
13: A/D (analog-to-digital) conversion circuit
14: control circuit
18, 18a: amplifier
CX: linear element

The invention claimed is:

1. A signal processing system which performs signal processing on a plurality of time-series signals which are sampled at a discrete time and are derived from a linear element driven in parallel on a basis of a code sequence, the signal processing being performed based on an inner product operation of the time-series signals and the code sequence, to estimate a value or an input of the linear element, the signal processing system comprising:
  first and second subsystems which have different input-output transfer characteristics; and
  a switching circuit which switches between the first subsystem and the second subsystem and then connects one of the first and second subsystems to the linear element, to reduce noise present in a result of estimation of the value or input of the linear element, which estimation is performed by signal processing through inner product calculation of the code sequence, on a basis of a frequency of noise mixed in each of the time-series signals, an amount of that noise, and the input-output transfer characteristics.

2. The signal processing system as set forth in claim 1, wherein
  there is a difference between (i) respective numbers of multiple samplings of the time-series signals derived from the linear element based on the first subsystem and (ii) respective numbers of multiple samplings of the time-series signals derived from the linear element based on the second subsystem.

3. The signal processing system as set forth in claim 1, wherein
  there is a difference between (i) a sampling frequency with respect to the time-series signals derived from the linear element based on the first subsystem and (ii) a sampling frequency with respect to the time-series signals derived from the linear element based on the second subsystem.

4. The signal processing system as set forth in claim 1, wherein
  polarities of respective codes of the plurality of time-series signals based on the first subsystem are inverted along a time series, and polarities of respective codes of the plurality of time-series signals based on the second subsystem are identical along a time series.

5. The signal processing system as set forth in claim 1, further comprising:
- a noise amount estimation section which estimates the amount of noise from an estimate of the linear element or from an estimate of the input of the linear element, wherein the estimates are obtained by the addition- and subtraction-based signal processing on the time-series signals, and
- the switching circuit switching between the first subsystem and the second subsystem on a basis of a result of the estimation performed by the noise amount estimation section.

6. The signal processing system as set forth in claim 1, further comprising:
- an analog-to-digital conversion circuit which performs analog-to-digital conversion on the plurality of time-series signals derived from the linear element and then generates a plurality of time-series signals which are sampled at the discrete time.

7. A touch panel controller which controls a touch panel including a plurality of electrostatic capacitors provided at respective intersections where a plurality of drive lines and a plurality of sense lines intersect with each other, the touch panel controller comprising:
- a driving circuit which drives the electrostatic capacitors in parallel along the drive lines on a basis of a code sequence;
- an amplifier circuit which (i) reads, along the sense lines, a plurality of linear sum signals based on respective ones of the electrostatic capacitors which are driven in parallel by the driving circuit and (ii) then amplifies the linear sum signals thus read;
- an analog-to-digital conversion circuit which performs analog-to-digital conversion on outputs of the amplifier circuit;
- a decoding operation circuit which estimates respective capacitance values of the electrostatic capacitors on a basis of an inner product operation of (i) the code sequence and (ii) respective ones of the outputs having been fed from the amplifier circuit and then subjected to the analog-to-digital conversion;
- first and second subsystems which have different input-output transfer characteristics; and
- a switching circuit which switches between the first subsystem and the second subsystem and then connects one of the first and second subsystems to the driving circuit, to reduce noise present in a result of estimation of respective values of the electrostatic capacitors, which estimation is performed by the addition- and subtraction-based signal processing performed by the decoding operation circuit, on a basis of a frequency of noise mixed in each of the linear sum signals, an amount of that noise, and the input-output transfer characteristics.

8. The touch panel controller as set forth in claim 7, wherein
- the first subsystem performs first through $(M+1)^{th}$ frame drivings of performing first through $(N+1)^{th}$ vector drivings in this order, the first through $(N+1)^{th}$ vector drivings each including an even-numbered phase driving and an odd-numbered phase driving, and
- the second subsystem successively performs respective $k^{th}$ vector drivings ($1 \leq k \leq N+1$) of the first through $(M+1)^{th}$ frame drivings.

9. The touch panel controller as set forth in claim 7, wherein
- the first subsystem performs first through $(M+1)^{th}$ frame drivings of performing first through $(N+1)^{th}$ vector drivings in this order, the first through $(N+1)^{th}$ vector drivings each including an even-numbered phase driving and an odd-numbered phase driving, and
- the second subsystem successively performs even-numbered phase drivings of respective $k^{th}$ vector drivings ($1 \leq k \leq N+1$) of the first through $(M+1)^{th}$ frame drivings, and successively performs odd-numbered phase drivings of the respective $k^{th}$ vector drivings.

10. The touch panel controller as set forth in claim 7, wherein
- the driving circuit further includes a third subsystem having an input-output transfer characteristic different from the input-output transfer characteristics of the first and second subsystems,
- the first subsystem performs first through $(M+1)^{th}$ frame drivings of performing first through $(N+1)^{th}$ vector drivings in this order, the first through $(N+1)^{th}$ vector drivings each including an even-numbered phase driving and an odd-numbered phase driving,
- the second subsystem successively performs respective $k^{th}$ vector drivings ($1 \leq k \leq N+1$) of the first through $(M+1)^{th}$ frame drivings, and
- the third subsystem successively performs even-numbered phase drivings of respective $k^{th}$ vector drivings ($1 \leq k \leq N+1$) of the first through $(M+1)^{th}$ frame drivings, and successively performs odd-numbered phase drivings of the respective $k^{th}$ vector drivings.

11. The touch panel controller as set forth in claim 7, wherein
- the first subsystem performs first through $(M+1)^{th}$ frame drivings of performing first through $(N+1)^{th}$ vector drivings in this order, the first through $(N+1)^{th}$ vector drivings each including an even-numbered phase driving and an odd-numbered phase driving, so that polarities of respective codes of the plurality of linear sum signals are inverted along a time series in respective ones of the first through $(M+1)^{th}$ frame drivings, and
- the second subsystem successively performs respective $k^{th}$ vector drivings ($1 \leq k \leq N+1$) of the first through $(M+1)^{th}$ frame drivings so that polarities of respective codes of the plurality of linear sum signals are inverted along a time series in respective ones of the first through $(N+1)^{th}$ vector drivings.

12. The touch panel controller as set forth in claim 7, wherein
- the first subsystem performs first through $(M+1)^{th}$ frame drivings of performing first through $(N+1)^{th}$ vector drivings in this order, each of the first through $(N+1)^{th}$ vector drivings including an even-numbered phase driving and an odd-numbered phase driving, so that polarities of respective codes of the plurality of linear sum signals are inverted along a time series in respective ones of the first through $(M+1)^{th}$ frame drivings, and
- the second subsystem successively performs even-numbered phase drivings of respective $k^{th}$ vector drivings ($1 \leq k \leq N+1$) of the first through $(M+1)^{th}$ frame drivings so that polarities of respective codes of the plurality of linear sum signals are inverted along a time series in respective ones of the even-numbered phase drivings, and successively performs odd-numbered phase drivings of the respective $k^{th}$ vector drivings so that polarities of respective codes of the plurality of linear sum signals are inverted along a time series in respective ones of the odd-numbered phase drivings.

13. The touch panel controller as set forth in claim 7, wherein the driving circuit further includes a third subsystem having an input-output transfer characteristic different from the input-output transfer characteristics of the first and second subsystems, the first subsystem performs first through $(M+1)^{th}$ frame drivings of performing first through $(N+1)^{th}$ vector drivings in this order, the first through $(N+1)^{th}$ vector drivings each including an even-numbered phase driving and an odd-numbered phase driving, so that polarities of respective codes of the plurality of linear sum signals are inverted along a time series in respective ones of the first through $(M+1)^{th}$ frame drivings, the second subsystem successively performs respective $k^{th}$ vector drivings ($1 \leq k \leq N+1$) of the first through $(M+1)^{th}$ frame drivings so that polarities of respective codes of the plurality of linear sum signals are inverted along a time series in respective ones of the first through $(N+1)^{th}$ vector drivings, and the third subsystem successively performs even-numbered phase drivings of respective $k^{th}$ vector drivings ($1 \leq k \leq N+1$) of the first through $(M+1)^{th}$ frame drivings so that polarities of respective codes of the plurality of linear sum signals are inverted along a time series in respective ones of the even-numbered phase drivings, and successively performs odd-numbered drivings of the respective $k^{th}$ vector drivings so that polarities of respective codes of the plurality of linear sum signals are inverted along a time series in respective ones of the odd-numbered phase drivings.

14. The touch panel controller as set forth in claim 7, wherein the first subsystem reduces a reset time of a reset signal for resetting the amplifier circuit (i) in a case where the plurality of electrostatic capacitors are driven so that polarities of respective codes of the plurality of linear sum signals are inverted along a time series, as compared with (ii) in a case where the plurality of electrostatic capacitors are driven so that polarities of respective codes of the plurality of linear sum signals are identical along a time series.

15. The touch panel controller as set forth in claim 7, wherein the amplifier circuit includes a differential amplifier which performs differential amplification on the linear sum signals outputted along corresponding respective adjacent sense lines.

16. A touch panel system, comprising:

a touch panel which includes a plurality of electrostatic capacitors provided at respective intersections where a plurality of drive lines and a plurality of sense lines intersect with each other; and a touch panel controller which controls the touch panel, the touch panel controller including:

a driving circuit which drives the electrostatic capacitors in parallel along the drive lines on a basis of a code sequence;

an amplifier circuit which (i) reads, along the sense lines, a plurality of linear sum signals based on respective ones of the electrostatic capacitors which are driven in parallel by the driving circuit and (ii) then amplifies the linear sum signals thus read;

an analog-to-digital conversion circuit which performs analog-to-digital conversion on outputs of the amplifier circuit;

a decoding operation circuit which estimates respective capacitance values of the electrostatic capacitors on a basis of an inner product operation of (i) the code sequence and (ii) respective ones of the outputs having been fed from the amplifier circuit and then subjected to the analog-to-digital conversion;

first and second subsystems which have different input-output transfer characteristics; and a switching circuit which switches between the first subsystem and the second subsystem and then connects one of the first and second subsystems to the driving circuit, to reduce noise present in a result of estimation of respective values of the electrostatic capacitors, which estimation is performed by the addition- and subtraction-based signal processing performed by the decoding operation circuit, on a basis of a frequency of noise mixed in each of the linear sum signals, an amount of that noise, and the input-output transfer characteristics.

17. An electronic apparatus, comprising:

a touch panel system as set forth in claim 16; and a display section which corresponds to the touch panel system.

* * * * *